United States Patent [19]
Tanaka et al.

[11] Patent Number: 5,848,885
[45] Date of Patent: Dec. 15, 1998

[54] REGENERATIVE BURNER AND REGENERATIVE HEAT EXCHANGE SYSTEM APPLICABLE THERETO

[75] Inventors: Ryoichi Tanaka; Mamoru Matsuo; Tsutomu Yasuda, all of Yokohama, Japan

[73] Assignee: Nippon Furnace Kogyo Kabushiki Kaisha, Kanagawa, Japan

[21] Appl. No.: 649,677

[22] PCT Filed: Dec. 1, 1994

[86] PCT No.: PCT/JP94/02027

§ 371 Date: May 22, 1996

§ 102(e) Date: May 22, 1996

[87] PCT Pub. No.: WO95/15462

PCT Pub. Date: Jun. 8, 1995

[30] Foreign Application Priority Data

Dec. 3, 1993 [JP] Japan .................... 5-339252

[51] Int. Cl.$^6$ ............... F24C 3/00; F23D 14/66; F23L 15/02
[52] U.S. Cl. ............... 431/215; 431/11; 432/180; 432/181; 165/8
[58] Field of Search ............... 431/11, 215, 207; 432/180, 181, 182; 126/91 A; 165/4, 7, 8

[56] References Cited

U.S. PATENT DOCUMENTS

| | | | |
|---|---|---|---|
| 1,858,508 | 5/1932 | Kignell et al. | 165/4 |
| 5,275,556 | 1/1994 | Hirose | 126/91 A |
| 5,456,216 | 10/1995 | Kaji et al. | 126/91 A |
| 5,460,519 | 10/1995 | Hirose et al. | 126/91 A |

FOREIGN PATENT DOCUMENTS

| | | |
|---|---|---|
| 175815 | 3/1989 | Japan . |
| 6-221545 | 8/1994 | Japan . |

*Primary Examiner*—Carl D. Price
*Attorney, Agent, or Firm*—Notaro & Michalos P.C.

[57] ABSTRACT

A regenerative heat exchange system performs heat exchange by alternately passing combustion exhaust gas as high-temperature fluid and combustion air as low-temperature fluid through a fixed regenerator. A regenerative burner carries out combustion using preheated air from the exchange system. The regenerative heat system comprises: a permeable regenerator partitioned into three or more chambers in the circumferential direction; a double-pipe outlet/inlet partitioned into a supply chamber and an exhaust chamber; and changeover member which isolates the regenerator from the outlet/inlet and by which the regenerator selectively communicates with the outlet/inlet by a supply communicating hole and an exhaust communicating hole which are provided with such a positional relation that the supply communicating hole and the exhaust communicating hole do not simultaneously lie in any of the partitioned chambers.

27 Claims, 18 Drawing Sheets

FIG. 5

| a\n | a=1 | a=2 | a=3 | a=4 | -- |
|---|---|---|---|---|---|
| n=2 | | | | | |
| n=4 | | | | | |
| n=6 | | | | | |
| n=8 | | | | | |
| | | | | | |

5,848,885

REGENERATIVE BURNER AND REGENERATIVE HEAT EXCHANGE SYSTEM APPLICABLE THERETO

FIELD OF THE INVENTION

The present invention relates to a regenerative burner for recovering waste heat from exhaust gas to preheat combustion air, and more particularly to a regenerative burner for alternately passing the combustion air and combustion exhaust gas through a fixed regenerator to preheat and supply the combustion air by using heat of the combustion gas. Further, the present invention relates to a regenerative heat exchange system for performing heat exchange through a regenerator between gas having a relatively-low temperature (low-temperature fluid) such as the combustion air and gas having a relatively-high temperature (high-temperature fluid) such as the combustion exhaust gas or between any other high-temperature gas and low-temperature gas in, e.g., the regenerative burner, and more particularly to a regenerative heat exchange system in which flowing directions of two types of fluid are fixed on a fluid inlet side and a fluid outlet side to cause no switching of passages.

BACKGROUND OF THE INVENTION

As shown in FIG. 18, for example, a prior art regenerative burner with which an extremely-low amount of Nox is generated has such a configuration that burner gun s (fuel nozzles) 102 are provided in respective wind boxes 101 so as to pierce through the wind boxes 101 so that combustion air supplied via regenerators 103 is mixed with fuel within the burner to be injected in a furnace. In other words, each fuel nozzle 102 and each combustion air injection nozzle (the wind box 101 in this example) form a pair in the prior art burner 104. The two burners 104 form a pair so that one burner 104 exhausts the combustion gas while the other burner 104 carries out combustion. The exhaust heat is recovered from the combustion gas in the regenerator 103 when the combustion gas is exhausted through the wind box 101 of one burner. Since the prior art regenerative burner alternately supplies the combustion air and the fuel to a pair of burners, it requires means for selectively connecting a combustion air supply system and an exhaust system to the burners and means for supplying the fuel to either of the burners. In order to switch passages of the combustion gas and the combustion air, combined use of solenoid valves, or use of a four-way valve or a three-way valve is considered to be employed. Note that a reference numeral 105 denotes a four-way valve; 106, a solenoid valve; 107, a forced draft fan; and 108, an induced draft fan in the drawing.

However, in the prior art burner structure in which the air nozzle and the fuel nozzle form a pair, there occurs a problem such as that the fuel nozzle may be damaged due to the emitted combustion exhaust gas having a high temperature or coking of the residual fuel is generated at the idle burner. In order to prevent the fuel nozzle from being damaged, the arrangement or the structure of the fuel nozzle must be complicated as in a burner disclosed in Japanese patent laid-open publication No. 2-10002, which may involves an increase in the size of the burner. In addition, in case of the regenerative burner employing such a system that the burners alternately perform combustion, since it is preferable for ignition to take a lead time in injection of the combustion air so that injection of the fuel is slightly delayed from that of the combustion air, such a complicated control that the fuel is supplied when a predetermined time has passed after changing of a flow of the combustion air is generally required. Thus, the regenerative burner which requires no switching of the fuel is desirable.

Further, when a combination of solenoid valves are used for switching passages of the combustion gas and the combustion air, the solenoid valves which can be used in the high-temperature atmosphere are expensive and involves increase in the facility cost, and since a gas piping solenoid valve is large in size, increase in a number of gas piping solenoid valves used takes up a space and reduction in a number of the valves used is thereby desirable. Also, in this case, supply of the combustion air and exhaust of the combustion gas are momentarily reduced or interrupted when performing switching, which may result in the unstable flame or increase in generation of CO. Furthermore, in the case where the four-way valve is used, the short pass of the exhaust system and the supply system is generated in the four-way valve at the moment of switching and an amount of the combustion air supplied to the burner is momentarily decreased, resulting in the unstable flame.

Moreover, as the heat exchange system which carries out heat exchange between fluids flowing in two types of passages through the regenerator, a Ljungström type air preheater such as shown in FIG. 19 is generally used. The Ljungstrom type air preheater 400 has such a configuration that ducts 402 through which gas having a relatively-high temperature such as the combustion exhaust gas flows and ducts 403 through which gas having a relatively-low temperature such as the combustion air flows are fixed to a casing 411, and flows of the gases to a disc type regenerator 401 are changed over by rotating the regenerator 401 without changing the passages so that the combustion air is preheated using heat recovered from the combustion exhaust gas. In the Ljungström type air preheater 400, each of the upstream side and the downstream side above and below the rotating regenerator 401 is divided into at least two chambers 406 and 407 or 409 and 410 by a partition wall 405 or 408 and a sealant 404. The rotating regenerator 401 is substantially divided into two by the sealant 404 in such a manner that the regenerator 401 is heated by the exhaust gas passing one region while the combustion air passing the other region is preheated by the heat of the regenerator 401. In this example, since the sealant 404 is not capable of sliding while being adhered to the regenerator 401 formed by radially arranging corrugated plates, a small gap is provided between the sealant 404 and the regenerator 401. In case of the Ljungström type air preheater, however, since flows of the gases toward the regenerator 401 are changed over by rotating the regenerator 401, employment of the regenerator which is large in size and weight complicates the structure of the rotating mechanism and involves increase in the dimension thereof. Further, since the regenerator is rotated, the regenerator itself tends to be damaged, and it is therefore difficult to manufacture the regenerator using ceramics or the like. Furthermore, sealing is difficult because the regenerator itself is rotated, and leakage of the fluid between the two passages may become approximately 25% at most. Thus, there occurs such a problem that the heat exchange efficiency is lowered or an amount of supply of the combustion air can not be accurately controlled when this regenerator is used for heat exchange between the combustion exhaust gas and the combustion air in the combustion system.

DISCLOSURE OF THE INVENTION

It is therefore an object of the present invention to provide a regenerative burner for only performing changeover of the combustion air which is continuously carried out without interruption and requiring no changeover of the fuel. Further, it is another object of the present invention is to provide, between two systems of passage, e.g. two passages of gases having temperatures largely different from each other, a regenerative heat exchange system having a simple changeover structure with which leakage or mixture of the gases is small and being capable preventing supply or exhaust of the fluid from being momentarily reduced or interrupted when changing over the passages.

To this end, a regenerative burner according to the present invention comprises: a regenerator partitioned into three or more chambers in a circumferential direction thereof in such a manner that a fluid can pass through each chamber in an axial direction thereof; a fuel nozzle which pierces through the center of the regenerator and injects fuel into a furnace; double-pipe type inlet/outlet means partitioned by an annular partition wall into a supply chamber connected to a combustion air supply system and an exhaust chamber connected to a combustion gas exhaust system; and changeover means which is provided between the regenerator and the outlet/inlet means to isolate the regenerator and the outlet/inlet means from each other, the changeover means being provided with such a positional relation that a supply communicating hole by which the regenerator communicates with the supply chamber and an exhaust communicating hole by which the regenerator communicates with the exhaust chamber do not simultaneously exist in the same chamber of the regenerator and a chamber of the regenerator through which the fluid does not flow is formed to at least one of the chambers of the regenerator having the exhaust communicating hole and the supply communicating hole provided respectively, and the changeover means continuously or intermittently rotated in order that the exhaust chamber and the supply chamber of the outlet/inlet means sequentially communicate with any chamber of the regenerator, thereby injecting from the regenerator the combustion air having a high temperature around continuously-injected fuel jet. With such an arrangement, the supply chamber and the exhaust chamber of the outlet/inlet means communicate with different chambers/compartments of the regenerator through the supply communicating hole and the exhaust communicating hole of the changeover means, and the combustion air and the combustion exhaust gas flow into the regenerator without being mixed together, thus injecting the combustion air having a high temperature from the regenerator into the furnace while continuously shifting the position of the flow around the fuel jet. Therefore, the conventional regenerative combustion according to the alternate combustion can be performed by only changing over the combustion air while constantly injecting the fuel, and facilities for changing the flow of the fuels or control units for adjusting the injection timing are not hence required. Further, since the chambers through which the combustion air and the combustion exhaust gas pass can be changed over by using a vacant chamber, the combustion air are not reduced nor the flow of which is interrupted during changeover, assuring the stable combustion. Furthermore, since the fuel nozzle is cooled down by the continuously-injected fuel, burning or fuel coking does not occur and the configurational position or the structure does not become complicated. Moreover, according to the regenerative burner of the present invention, since changeover of the flow of the high-temperature air is continuously carried out, lack of oxygen in the furnace does not occur even if the excess air factor is set to a minimum value, maintaining the stable combustion to suppress the amount of generation of CO to a minimum level. If the low excess air factor approximates to a theoretical amount of air, the fuel and the combustion air having an extremely-high temperature which approximates to a temperature of the combustion exhaust gas cause slow combustion in the furnace, and an amount of generation of NOx is reduced to attain complete combustion.

The regenerative burner of the present invention described herein substantially-equally partitions the regenerator into N chambers (N=n+1, where n is a positive even number equal to or above 2 and corresponds to a number of chambers through which the fluid constantly flows) in the circumferential direction thereof. Meanwhile, n/2 supply communicating holes and n/2 exhaust communicating holes of the changeover means are alternately provided, and each exhaust communicating hole and each supply communicating hole of the changeover means are provided with an angle a represented by a following formula 1 therebetween:

$$\frac{1}{n-1}\left\{360° - \left(\frac{360°}{n+1} + \frac{\beta_1 + \beta_2}{2}\right)\right\} > \qquad (1)$$

$$\alpha > \frac{360°}{n+1} + \frac{\beta_1 + \beta_2}{2}$$

where $\beta_1$ represents a central angle which is circumscribed by the communicating hole for the high-temperature fluid from a rotational center 0 of the changeover portion, and $\beta_2$ represents a central angle which is circumscribed by the communicating hole for the low-temperature fluid from the rotational center 0 of the changeover portion. Also, dimensions of the supply communicating hole and the exhaust communicating hole satisfy the relation represented by a following formula 2:

$$\frac{360°}{n+1} > \frac{n}{2}(\beta_1 + \beta_2) \qquad (2)$$

Further, the regenerative burner according to the present invention substantially-equally partitions the regenerator into a plurality of units each of which consists of N chambers (where N=n+1, and n is a positive even number equal to or above 2 and corresponds to a number of chambers through which the fluid constantly flows) so that a total number of chambers is Z (here, Z=a·N, and a is a positive integer except 0 and represents a number of units); a vacant chambers, through which no fluid constantly flows, among a total of Z chambers are provided between N chambers constituting one unit and N chambers forming another unit; and the arrangement angle α between the exhaust communicating hole and the supply communicating hole has the relation represented by a following formula 3:

$$\frac{1}{n-1}\left\{\frac{360°}{a} - \left(\frac{1}{a}\cdot\frac{360°}{n+1} + \frac{\beta_1 + \beta_2}{2}\right)\right\} > \qquad (3)$$

$$\alpha > \frac{1}{a}\cdot\frac{360°}{n+1} + \frac{\beta_1 + \beta_2}{2}$$

and dimensions of the exhaust communicating hole and the supply communicating hole satisfy the relation represented by a following formula 4:

$$\frac{1}{a}\cdot\frac{360°}{n+1} > \frac{n}{2}(\beta_1 + \beta_2) \qquad (4)$$

Here, the combustion gas is attracted from the furnace and flows into a·n/2 chambers in the regenerator partitioned into a·N chambers while the combustion air is thrusted and flows into the other a·n/2 chambers, and the remaining a chambers are not connected to any passage and thereby become vacant chambers through which the fluid does not flow. Therefore, if the chambers/compartments communicating with the supply chamber of the outlet/inlet means and those communicating with the exhaust chamber of the same are successively changed over by the operation of the changeover means, the fluid to be exhausted and the fluid to be supplied flow through the same chambers/compartments of the regenerator at different times. For example, the combustion air flows through the regenerator through which the combustion exhaust gas has already flown, and the combustion air takes the heat from the regenerator which has been heated by passage of the combustion exhaust gas to complete heat exchange. As to changeover of flows of the fluid, since the supply communicating hole and the exhaust communicating hole do not exist in the same chamber/compartment and communicating holes sequentially communicate with the next chamber/compartment one after another, even when the exhaust communicating hole reaches the next chamber/compartment of the regenerator, namely, air flows therethrough for example, the following supply communicating hole and other exhaust and supply communicating holes still exist in the same chamber/compartment, and no changeover thereby starts. After the position of the leading exhaust communicating hole is completely changed to the next compartment, the chamber/compartment with which the leading exhaust communicating hole has communicated becomes vacant and the next supply communicating hole starts to communicate therewith. At this stage, the supply communicating hole simultaneously extends over two compartments, i.e., the current chamber/compartment and a new chamber/compartment (vacant chamber), and the position of this communicating hole is changed to these two chambers/compartments while supplying the fluid to the both of them, whereby flow of the fluid is not interrupted. Further, since the leading exhaust communicating hole is positioned in the chamber/compartment preceding the chamber/compartment with which the supply communicating hole starts to communicate, the combustion exhaust gas to be emitted is not mixed with the combustion air to be supplied in the same compartment.

Note that the chambers partitioned in the regenerator correspond to a plurality of chambers obtained by partitioning the regenerator itself as well as a plurality of chambers substantially partitioned by the dividing means in the present specification.

In addition, the regenerative burner according to the present invention substantially-equally partitions the regenerator in N (N=n+2, where n is a positive integer equal to or above 2 and corresponds to a number of chambers through which the fluid constantly flows) in the circumferential direction thereof, and each supply communicating hole by which the supply chamber communicates with the regenerator and each exhaust communicating hole by which the exhaust chamber communicates with the regenerator in the changeover means are provided with an angle C represented by a following formula 5 therebetween:

$$\frac{360°}{N} < C < 2 \cdot \frac{360°}{N} \quad (5)$$

Further, according to the regenerative burner of the present invention, the regenerator is substantiallyequally partitioned in the circumferential direction thereof into a plurality of units, one unit being made up of N (where N=n+2, and n is a positive integer equal to or above 2 and corresponds to a number of chambers through which the fluid constantly flows) chambers and a total number of chambers being Z (where Z=a·N, and a is a positive integer representing a number of units except 0), and an angle C represented by the following formula 6 is set between the exhaust communicating hole and the supply communicating hole:

$$\frac{360°}{Z} < C < 2 \cdot \frac{360°}{Z} \quad (6)$$

In this example, in regard of changeover of flows of the fluid, positions of the exhaust communicating hole and the supply communicating hole are simultaneously changed to the front vacant chambers, respectively. When the positions of the exhaust communicating hole and the supply communicating hole are completely moved to the front chambers/compartments, the chambers/compartments with which the exhaust communicating hole and the supply communicating hole communicate become vacant. In this example, if the exhaust communicating hole and the supply communicating hole simultaneously communicate with a plurality of chambers/compartments, the chamber/compartment which is rearmost in the rotational direction becomes vacant. At this stage, each of the exhaust communicating hole and the supply communicating hole simultaneously extends over the current chamber/compartment and a new chamber/compartment and changes its position while supplying the fluid to the both of these compartments, thereby preventing flow of the fluid from being interrupted. Moreover, since the front exhaust communicating hole is positioned in the compartment preceding the compartment to which the position of the supply communicating hole is changed, the combustion exhaust gas to be emitted is not mixed with the combustion air to be supplied in the same compartment.

Further, according to the regenerative burner of the present invention, the fuel fed from the fuel nozzle and the combustion air supplied from the regenerator are injected in substantially parallel with each other, or the fuel nozzle rotates together with the changeover means to constantly inject the fuel from side toward flow of the combustion air injected from the regenerator.

In the present invention, the combustion air having a high temperature close to that of the combustion exhaust gas is stably supplied from the circumference of the fuel nozzle directly into the furnace without causing momentary reduction or interruption of the combustion air.

In the case where the combustion air and the fuel are injected in parallel with each other, they spread without being mixed together immediately after injected into the furnace and are then mixed everywhere in the furnace apart from the combustion nozzle and the air nozzle. However, since the combustion air has an extremely-high temperature (for example, approximately 1000° C. or above), stable combustion occurs when the combustion air is mixed with the fuel. Further, when heat of the regenerator is lowered, the combustion air is supplied by utilizing the regenerator as the combustion air supplying means, which have exhausted the combustion gas, by only changing over supply of the combustion air without switching that of the fuel. The result similar to that of alternate combustion can be therefore obtained by only changing over supply of the combustion air. Furthermore, the high-temperature air and the fuel cause slow combustion everywhere in the furnace, and an amount of generation of NOx can be greatly reduced without losing characteristics as the regenerative burner, as compared with the prior art regenerative burner.

Moreover, in the case where the fuel is constantly injected from side toward the combustion air, the fuel jet behaves as the cross-wind jet to join the straightly-injected combustion air jet. At this stage, a pair of circulating flows which are vortical regions whose directions are opposed to each other are generated in the combustion air jet by the cross-wind jet/fuel jet, and the fuel jet is taken in the jet of the combustion air. The high-density region of the combustion air jet is complicatedly diffused in the cross section by multiple large and small vortexes generated within each of the two vortical regions and, at the same time, the fuel jet taken in the central part of the jet is also diffused to spread. In other words, after being taken in the combustion air jet, the fuel jet gradually spreads within the entire jet and is mixed with the high-temperature combustion air to perform combustion in the combustion air jet. Meanwhile, combustion occurs on the surface of the fuel jet which is mixed with the combustion air to generate NOx, and NOx is taken in the fuel jet by the circulating flow to be rapidly deoxidized. Thus, since the fuel jet is taken in the high-temperature combustion air jet and diffused within the combustion air jet to carry out combustion, the generated NOx is further taken in the fuel jet to be deoxidized, thereby extremely reducing the NOx.

Further, according to the regenerative burner of the present invention, nozzles which are independent from each other and communicate with the respective partitioned chambers of the regenerator are provided at an outlet of the regenerator which is directed to the furnace. In this case, when compartments of the regenerator through which the combustion exhaust gas and the combustion air flow are changed over by rotation of the changeover means, the nozzles from which the combustion air is injected are sequentially moved in the circumferential direction. Therefore, when the combustion air is injected from each nozzle directly into the furnace, the position of a flame is rotated in the furnace along the circumferential direction to form a non-stationary flame. Further, the momentum of the combustion air is controlled by the nozzles, and a flame having a predetermined shape and property can be formed. The combustion air is injected directly into the furnace from the independent nozzles, respectively, and the position of the combustion air so moves as to rotate around the combustion nozzles in the circumferential direction to enable formation of such a non-stationary flame that the frame made in the furnace rotates in the circumferential direction. Thus, even in case of the extremely-high-temperature flame, an object which is to be heated and provided around the burner, e.g., a tube of a water-tube boiler can be prevented from being overheated. Also, the jet velocity (momentum) of the combustion air injected into the furnace can be controlled without restraint by changing the size of an opening of each nozzle, thereby varying the shape and property of the flame.

In addition, according to the regenerative burner of the present invention, a burner throat whose passage cross section narrows toward an end thereof is formed in front of the regenerator and the fuel nozzle, and there is provided a burner tile to which a by-pass hole for communicating the burner throat with the furnace to directly lead the exhaust gas in the furnace into the burner throat is formed. In this case, since the injection energy of the combustion air injected from the regenerator provokes such an exhaust gas recirculation that a part of the high-temperature combustion exhaust gas in the furnace is accompanied with the combustion air to be attracted into the burner throat, an amount of NOx is reduced while a capacity of the combustion gas is increased, and the combustion gas can thereby reach the inner part of the furnace.

Further, according to the regenerative burner of the present invention, independent nozzles communicating with the respective partitioned chambers of the regenerator are provided at an outlet of the regenerator close to the furnace, a single burner throat is formed in front of the nozzles and the fuel nozzle, and a burner tile to which a plurality of by-pass holes which make communication of the furnace with the burner throat to directly lead the exhaust gas in the furnace into the burner throat are formed is provided. In this case, the jet velocity (momentum) of the combustion air can be controlled without restraint by changing the size of an opening of each nozzle, and the shape and property of the flame can be varied. For example, it is possible to obtain a strong flame or a weak flame.

Furthermore, according to the regenerative burner of the present invention, a number of chambers communicating with the exhaust chamber to pass the combustion exhaust gas therethrough is larger than that of chambers communicating with the supply chamber to pass the combustion air therethrough. In this case, the exhaust velocity is greatly lower than the jet velocity of the combustion air so that occurrence of short pass such as that the combustion air flows into the exhaust system immediately after injection is suppressed.

Moreover, the heat exchange system comprising the outlet/inlet means, the changeover means and the regenerator which are incorporated in each aspect of the above-mentioned present invention can be used as an independent heat exchange system. For example, in the heat exchange system defined in claims 1 to 5 or claims 12 to 16 of the present invention, removal of the fuel nozzle piercing through the center of the system and provision of the changeover means and outlet/inlet means on both the upstream side and the downstream side of the regenerator enable configuration of the regenerative heat exchange system which switches flowing directions of the fluid with respect to the regenerator between the changeover means on the upstream side and the changeover means on the downstream side while flowing directions of the two types of fluid connected to the outlet/inlet means on the upstream side and the outlet/inlet means on the downstream side are fixed. In this example, the term "the two types of fluid" used in this specification is relatively defined and means the relative low-temperature fluid and high-temperature fluid, e.g., the combustion exhaust gas and the ordinary-temperature combustion air or the ordinary-temperature air and the thermal gas. Therefore, in the regenerative heat exchange system according to the present invention, in order not to lead such a misunderstanding that the two types of fluid are restricted to the combustion air (low-temperature fluid) and the relatively- high-temperature combustion gas (high-temperature fluid) in the regenerative burner defined in claims 1 to 16 and unable to be applied to any other heat exchange system such as an exhaust heat recovery system and others, the supply chamber and the exhaust chamber of the outlet/inlet means of the heat exchange system incorporated in the regenerative burner defined in claims 1 to 16 are referred to as a low-temperature fluid chamber and a high-temperature fluid chamber and the supply communicating hole and the exhaust communicating hole of the changeover means of the same are referred to as a low-temperature communicating hole and a high-temperature communicating hole, respectively for the convenience' sake, although these members are the same means, respectively.

To state more concretely, the regenerative heat exchange system according to the present invention comprises: a regenerator partitioned into three or more chambers in a circumferential direction thereof to enable pass of the fluid through each chamber in an axial direction thereof; double-pipe outlet/inlet means which are connected to both opening ends of the regenerator and each of which is partitioned by an annular partition wall into a low-temperature fluid chamber connected to a low-temperature fluid system which is one of two types of passages for flowing fluids having temperatures different from each other and a high-temperature fluid chamber connected to a high-temperature fluid system which is the other of the same; and changeover means which is provided between the regenerator and each outlet/inlet means positioned in front of or at the rear of the regenerator to isolate the regenerator and each outlet/inlet means from each other, the changeover means being provided in such a positional relation that a low-temperature fluid communicating hole by which the regenerator communicates with the low-temperature fluid chamber and a high-temperature fluid communicating hole by which the regenerator communicates with the high-temperature fluid chamber do not simultaneously exist in the same chamber of the regenerator and a chamber of the regenerator through which the fluid does not flow is formed to at least one of the chambers of the regenerator having the high-temperature fluid communicating hole and the low-temperature fluid communicating hole provided respectively, and the changeover means continuously or intermittently rotated in order that the low-temperature fluid chamber and the high-temperature fluid chamber of each outlet/inlet means provided in front of or at the rear of the regenerator sequentially communicate with any chamber of the regenerator. With such an arrangement, the high-temperature fluid chamber and the low-temperature fluid chamber of each outlet/inlet means provided in front of or at the rear of the regenerator communicate with different chambers/compartments of the regenerator through the low-temperature fluid communicating hole and the high-temperature fluid communicating hole of the changeover means respectively, and flow the low-temperature fluid and the high-temperature fluid into the regenerator without mixing these two types of fluid together. In other words, when the chambers/compartments communicating with the low-temperature fluid chamber of the outlet/inlet means and chambers/compartments communicating with the high-temperature fluid chamber of the same are sequentially changed over by an operation of the changeover means, the high-temperature fluid and the low-temperature fluid flow in the same chamber/compartment of the regenerator at different times, and the low-temperature fluid takes heat from the regenerator heated by pass of the high-temperature fluid to perform heat exchange. Further, since flows of the high-temperature fluid and the low-temperature fluid are change over by using vacant chambers, flow of the fluid is not reduced nor it is interrupted during changeover. Thus, in the case where the regenerative heat exchange system is connected to the combustion air system and the combustion exhaust gas system in a burner system, the combustion air having a high temperature close to a temperature of the combustion exhaust gas can be stably supplied to the burner without causing momentary reduction or interruption of the flow of the combustion air, thereby realizing continuous regenerative combustion without switching supplies of the fuel or the combustion air.

Here, according to the regenerative heat exchange system of the present invention, in regard of a number of chambers/compartments, which are substantially-equally partitioned in the circumferential direction thereof, of the regenerator and the arrangement relation or dimensions of the low-temperature fluid communicating hole and the high-temperature fluid communicating hole of the changeover means provided in front of or at the rear of the regenerator, it is preferable to satisfy conditions which are the same with those represented by Formulas 1 to 6 as similar to the regenerative heat exchange system incorporated in the regenerative burner defined in claims 2 to 5. Flows of the two types of fluid in this case are changed over in such a manner that the high-temperature fluid and the low-temperature fluid are assuredly distributed to different chambers/compartments of the regenerator to pass through the regenerator without being mixed together and heat exchange is performed with a high efficiency, as similar to the operation of the changeover means defined in claims 2 to 5.

Further, although the regenerator in all the above-described aspects of the present invention may be preferably formed into a honeycomb shape having a plurality of cell holes communicating in the axial direction, it is not restricted to this structure, and the present invention can be embodied by a regenerator obtained by arranging a plurality of pipe-shaped regenerative members in the diametric direction so that the fluid can pass in the axial direction, a regenerator obtained by radially arranging a plurality of flat-plate type or corrugated-plate type regenerative members, or a regenerator obtained by being independently partitioned into a·N chambers and filling blocks or small pieces of regenerative material in a casing through which the fluid can pass in the axial direction. In either case, the combustion air and the exhaust gas are not mixed together in the regenerator.

BRIEF DESCRIPTION OF THE DRAWINGS

FIG. 5 is a chart showing a number of chambers N with the relation between a number of chambers n through which the fluid flows and a number of units a;

FIG. 8 is a chart showing arrangement of chambers with the relation between a number of chambers n through which the fluid flows and a number of units a;

BEST STATES FOR EMBODYING THE PRESENT INVENTION

The structure of the present invention will now be described in detail hereinbelow in connection with the accompanying drawings.

Figure 1:
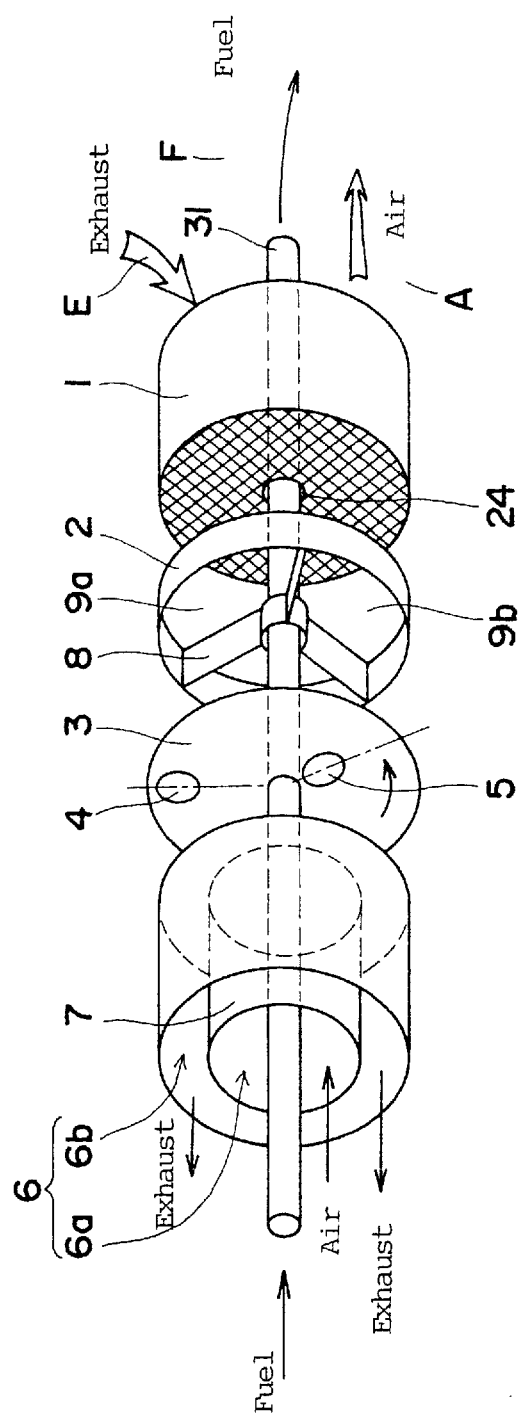
FIG. 1 is a perspective view showing a basic structure of a regenerative burner according to the present invention.

FIG. 1 is a principle view showing one embodiment of a regenerative burner according to the present invention. This regenerative burner is designed to separately inject into a furnace 35 fuel F and combustion air A having a higher temperature (hot air having a temperature, e.g., 800° C. or above, and more preferably, approximately 1000° C. to 1100° C.) than that of the combustion air used for the conventional diffuse combustion, i.e., approximately 300° C. to 400° C., in order to perform combustion. More particularly, the regenerative burner of this embodiment has such a configuration that a fuel nozzle 31 for injecting the fuel F into the furnace 35 pierces the center of a regenerator 1 so that the high-temperature combustion air A is injected from the circumference of the fuel F in parallel with each other. Here, the temperature of the combustion air A is increased when passing through a portion where the combustion gas of the regenerator 1 is exhausted. Further, an amount of the combustion air A injected into the furnace 35 through the regenerator 1 is substantially full and, in some cases, a part (usually a few %) of the combustion air A may be injected from a gap 24 between the fuel nozzle 31 and the regenerator 1 provided therearound into the furnace 35 at an ordinary temperature as cooling air of the fuel nozzle 31. It can be, however, said that the combustion air A whose amount is substantially full is heated by passing through the regenerator 1 and thereafter injected into the furnace 35.

In this example, the regenerative heat exchange system intended to supply the combustion air A and exhaust the combustion exhaust gas E by alternately passing them through the regenerator 1 is, basically, made up of: the regenerator 1 which is partitioned into three or more chambers in the circumferential direction thereof so that the fluid can pass through each chamber in the axial direction; outlet/inlet means 6 having a supply chamber 6a connected to a combustion air supply system 33 and an exhaust chamber 6b connected to a combustion gas exhaust system 34; and changeover means 3 which is provided between the outlet/inlet means 6 and the regenerator 1 to isolate the regenerator 1 and the outlet/inlet means 6 from each other and enables communication of the exhaust chamber 6b and the supply chamber 6a of the outlet/inlet means 6 with any of N partitioned chambers of the regenerator 1 by continuous or intermittent rotation. The regenerator 1 is substantially-equally partitioned into at least three chambers by itself or a dividing member 2 or the like provided on an upstream side of the regenerator 1. In this example, it is preferable that the regenerator 1 is equally partitioned in the circumferential direction. In such a case, even when compartments/chambers of the regenerator 1 through which the combustion air flows are changed over, a jet quantity and a jet velocity of the combustion air can be constant to stabilizing combustion. The dimensions of compartments/chambers of the regenerator do not have to be strictly equal to each other, and irregularity may be allowed as long as combustibility is not affected.

Figure 3:
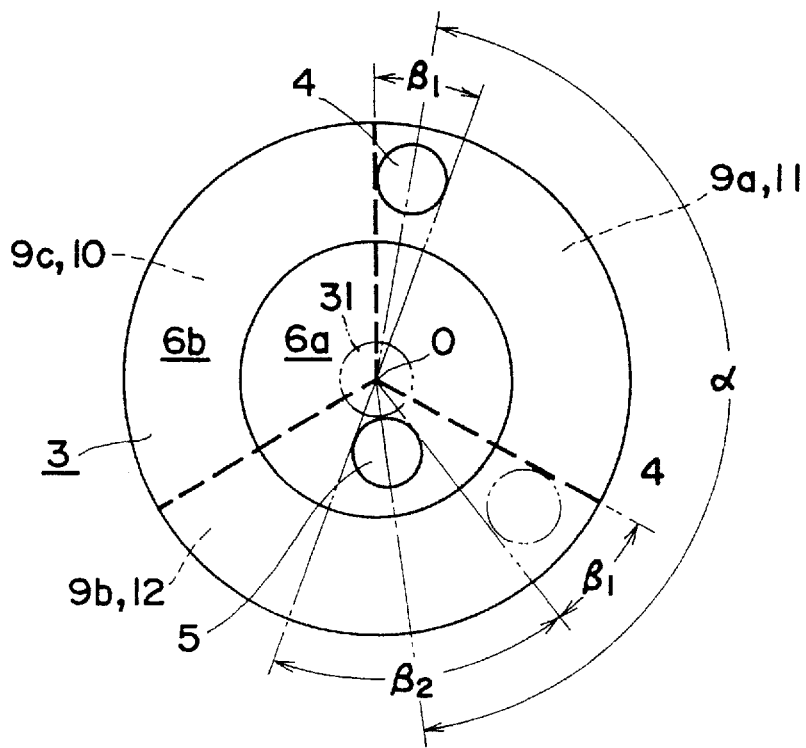
FIG. 3 is an explanatory view showing a relation between an exhaust communicating hole and a supply communicating hole.
Figure 10A:
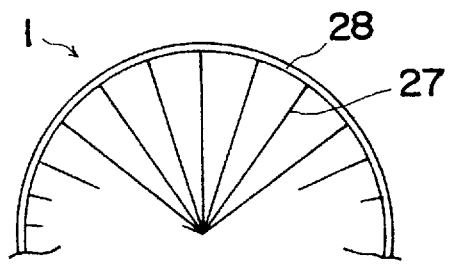
FIGS. 10 are explanatory views showing another embodiment of the regenerator, wherein (A) shows such a type that plates are radially arranged, (B) shows such a type that corrugated plates are radially arranged, (C) shows such a type that pipes are bundled and (D) shows such a type that regenerative material is filled in a casing partitioned into N chambers.
Figure 10B:
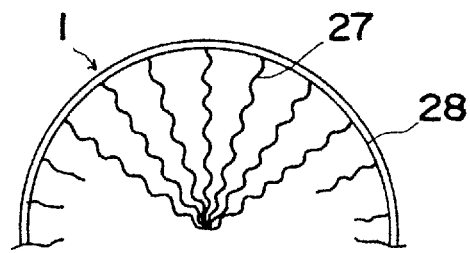
Figure 10C:
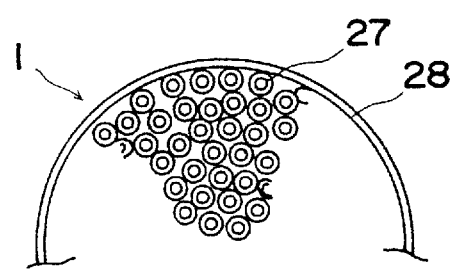
Figure 10D:
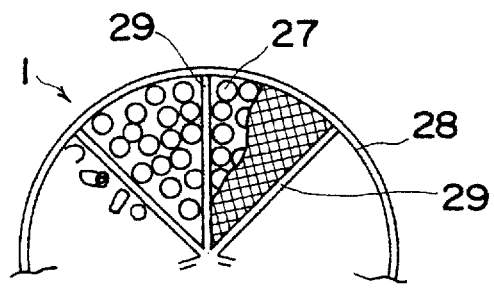

Although the regenerator 1 is not restricted to a certain shape or material, it is preferable to use a honeycomb-shaped regenerator manufactured by extrusion-molding ceramics such as cordierite or mullite for heat exchange carried out between high-temperature fluid having a temperature approximately 1000° C. such as the combustion exhaust gas and low-temperature fluid having a temperature approximately 20° C. such as the combustion air. Also, the honeycomb-shaped regenerator 1 may be produced from material other than ceramics, e.g., metal such as heat resistant steel. Further, in case of a medium or high temperature approximately 500° C. to 600° C., metal such as aluminium, iron or copper which are relatively cheaper than ceramics may preferably used incidentally, although the honeycomb shape essentially means a shape having hexagonal cells (holes), one to which a plurality of square or triangular cells, as well as hexagonal cells, are formed is included in this specification. Further, the honeycomb-shaped regenerator 1 may be obtained by bundling pipes instead of the above-described integral molding. In this embodiment, the regenerator 1 is partitioned into Z (a·N) chambers in the circumferential direction by the dividing means 2 provided in front of the regenerator 1. For example, in case of the embodiment illustrated in FIG. 1, inside of the regenerator 1 is partitioned by the dividing means 2, which is partitioned into three chambers 9a, 9b and 9c by partitions 8, into three chambers, i.e., a vacant chamber 10 through which the fluid does not flow, a chamber 11 through which the combustion exhaust gas flows and a chamber 12 through which the combustion air flows as shown in FIG. 3. That is, since the regenerator 1 itself has a honeycomb shape constituted by a set of cells forming independent passages, each area partitioned by the dividing means 2 forms one compartment. If the dividing means 2 is provided, the incoming fluid flowing through communicating holes 4 an 5 can be diffused to be equally diverted over the entire area of the regenerator 1. In addition, the shape of the regenerator 1 is not restricted to the illustrated honeycomb shape, and as shown in FIGS. 10(A) and (B), flat-plate type or corrugated-plate type regenerative members 27 can be radially arranged within a cylindrical casing 28, or as shown in FIG. 10(C), pipe type regenerative members 27 may be filled in the cylindrical casing 28 so that the fluid flows therethrough in the axial direction. Further, although the single regenerator 1 is substantially divided into Z chambers by dividing means 2 in this embodiment, the present invention is not restricted to this structure, and the regenerator 1 itself may be partitioned into a·N chambers. For example, as shown in FIG. 10(D), the regenerator 1 may be divided into a·N chambers in the circumferential direction by partition walls 29, a cylindrical casing 28 through which the fluid can pass in the axial direction may be prepared, and a lump of, e.g., globular type, short-pipe type, short-rod type, thin-piece type, nugget type or mesh type regenerative members 27 is filled in each chamber. In the case where there are employed the regenerative members 27 of such as SiN which can be used at an extremely high temperature as compared with cordierite or mullite, it is difficult to perform molding to obtain a complicated honeycomb shape, but this regenerative material can be easily molded into simple pipe-like shape, a rode-like shape or a ball-like shape. Therefore, it is preferable to adopt the structures of the regenerator such as shown in FIGS. 10(C) and (D).

Figure 5:
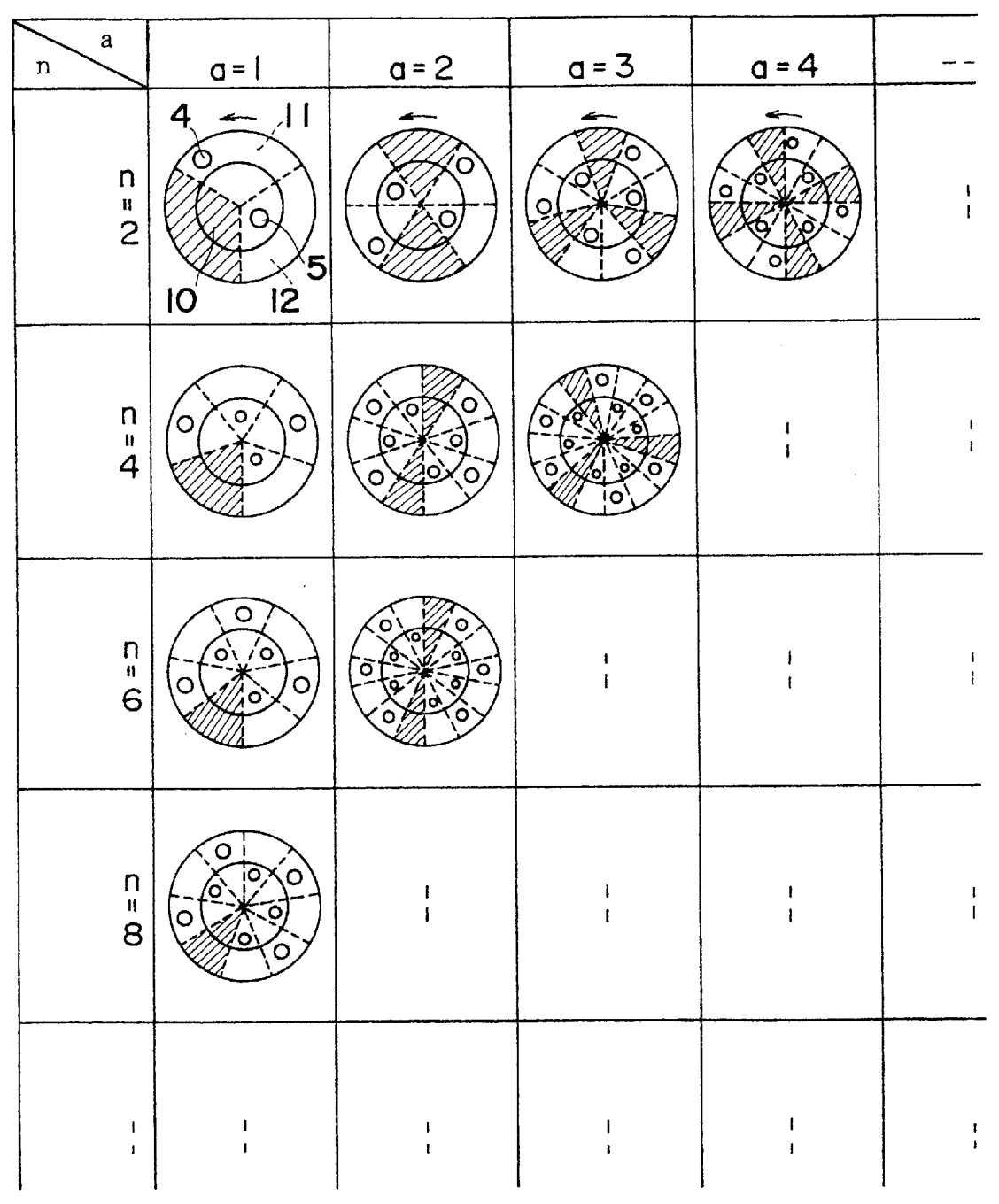
Figure 6:
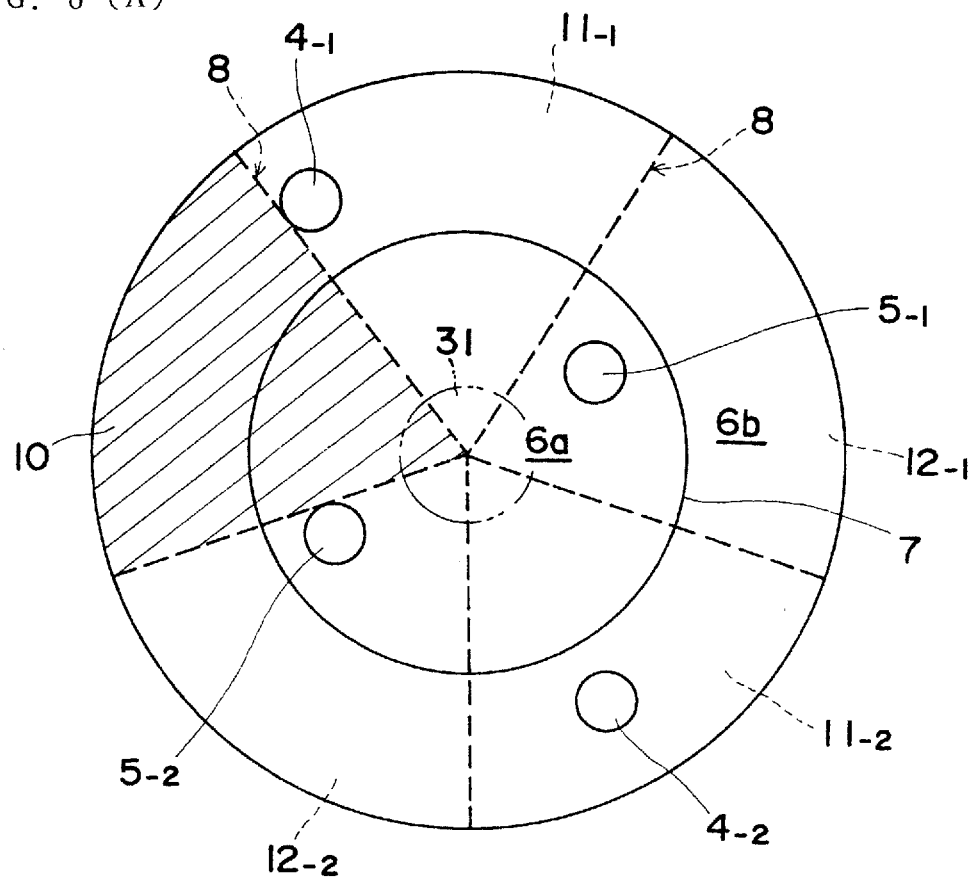
FIGS. 6 are views showing a relation between the exhaust communicating hole and the supply communicating hole when n=4 and a=1 are satisfied, wherein (A) is a layout of all the communicating holes and (B) is an explanatory view of the state where all the holes are concentrated in one chamber.
Figure 6:
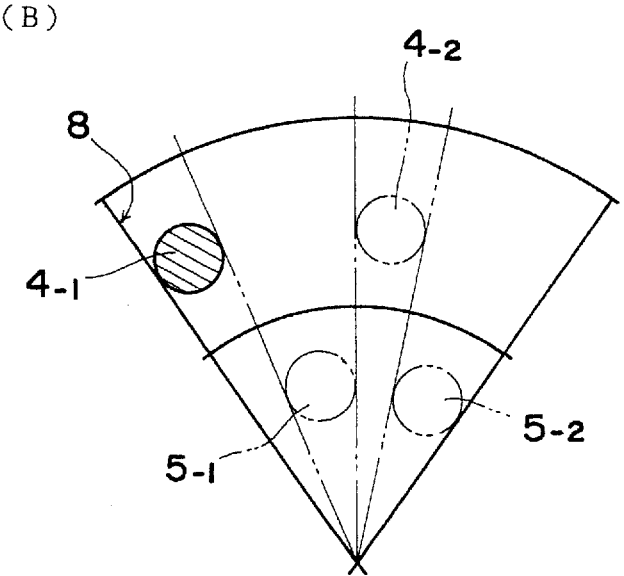

In this embodiment, in regard of a number of partitioned chambers of the regenerator 1, a chamber through which the combustion air flows (which will be referred to as a supply chamber hereinbelow) 12 and a chamber through which the combustion exhaust gas flows (which will be referred to as an exhaust chamber hereinbelow) 11 form a pair, and one vacant chamber (a chamber through which no fluid flows) 10 is combined with at least one pair. Assuming that n=2 is satisfied, since N=n+1, three is a minimum number of chambers. With a pair of the exhaust chamber 11 and the supply chamber 12, FIG. 6 shows an example in which two pairs obtained by the exhaust chambers $11_{-1}$ and $11_{-2}$ and the supply chambers $12_{-1}$ and $12_{-2}$ are combined. In this manner, any number of pairs can be made. Further, assuming that N chambers form one unit, a plurality of units can be constituted. That is, a total number of chambers Z is represented by an equation Z=a·N (where a is a positive integer representing a number of units except 0). In this case, positions of the respective communicating holes 4 and 5 are determined so that the vacant chamber is provided between two adjacent units. When N chambers form one unit in this way, a plurality of units constituted by a total of Z chambers can be formed in the regenerator 1. Such a relation is exemplified in FIG. 5. The positional relation between the exhaust communicating hole 4 and the supply communicating hole 5 or dimensions of these holes 4 and 5 are not correctly represented in FIG. 5 for convenience' sake.

Figure 2:
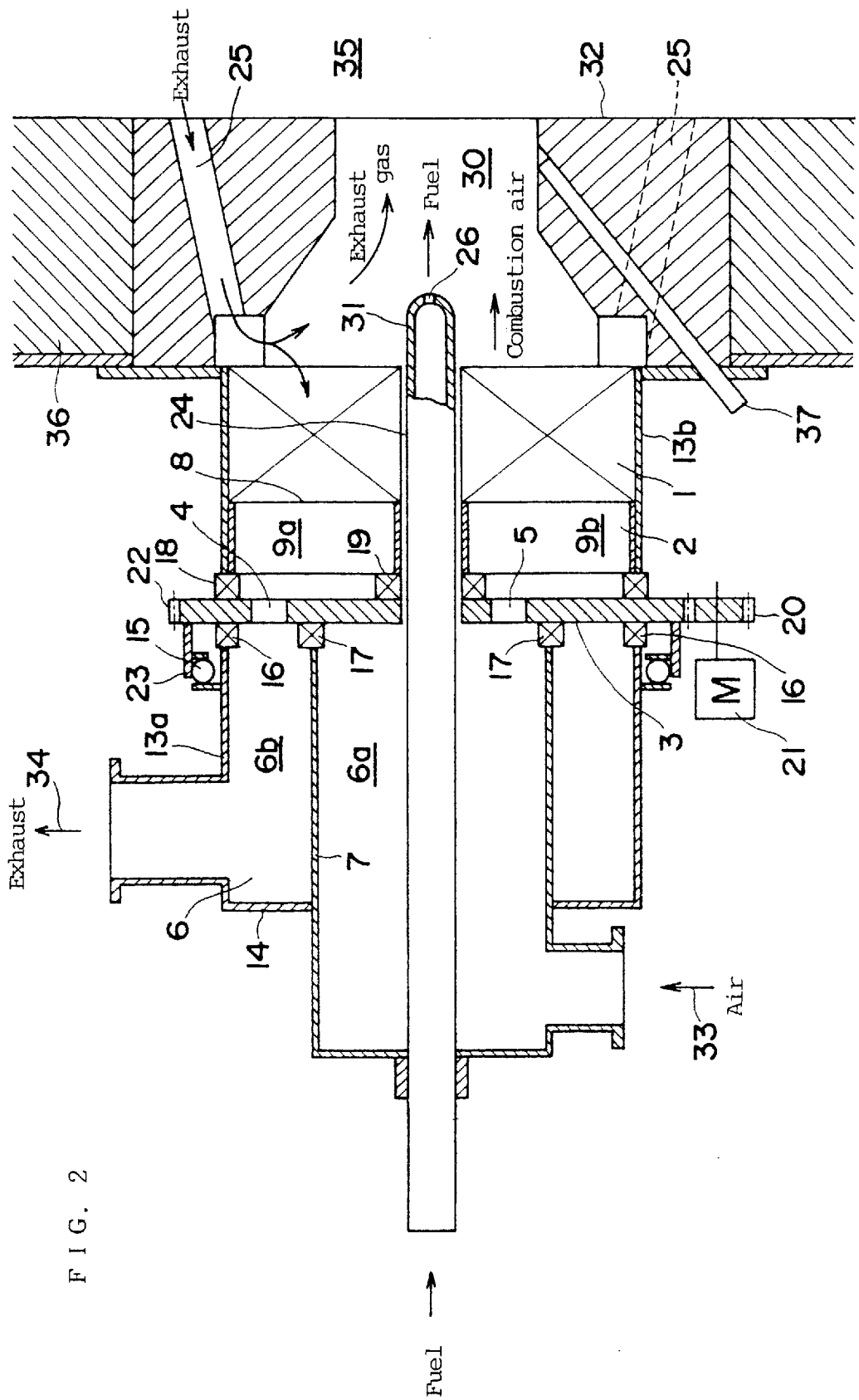
FIG. 2 is a sectional view showing an embodiment of the regenerative burner according to the present invention.

The outlet/inlet means 6 is partitioned into a supply chamber 6a connected with a combustion air supply system 33 and an exhaust chamber 6b connected with an exhaust system 34 by annular partition wall, e.g., a cylindrical partition wall 7. In this embodiment, the supply chamber 6a is formed inside of the partition wall 7 while the exhaust chamber 6b is formed outside of the same 7. The changeover means 3 independently rotates between the outlet/inlet means 6 and the dividing means 2. For example, as shown in FIG. 2, the outlet/inlet means 6 has a bearing member 15 provided between an outer cylindrical portion 13a thereof and a support ring 23 of the changeover means 3 to rotatably support the changeover means 3. Sealing members 16 and 17 are provided between the outlet/inlet means 6 and the changeover means 3 in order to prevent the fluid from leaking.

The changeover means 3, by which the supply chamber 6a and the exhaust chamber 6b of the outlet/inlet means 6 communicate with only the corresponding chambers/compartments 12 and 11 of the regenerator, is formed of a disc orthogonal to the passage and has a·n/2 supply communicating holes 5 by which one compartment of the regenerator 1 communicates with the supply chamber 6a and a·n/2 exhaust communicating holes 4 by which one compartment of the same communicates with the exhaust chamber 6b. For example, since n is 2 and a is 1 in FIG. 1, one supply communicating hole 5 and one exhaust communicating hole 4 are formed. Further, the exhaust communicating hole 4 and the supply communicating hole 5 must satisfy the following conditions: ①̂ the supply communicating hole 5 and the exhaust communicating hole 4 do not simultaneously exist in the same chamber/compartment; ②̂ the communicating holes sequentially change their positions toward the preceding chamber/compartment one after another, starting from the leading communicating hole positioned in a chamber/compartment adjacent to the vacant chamber 10; and ③̂ the supply communicating hole 5 and the exhaust communicating hole 4 must have such dimensions as that all the communicating holes can be concentrated in one chamber when n communicating holes are so provided as not to overlap one on another in the radial direction. That is, n/2 exhaust communicating holes 4 by which the exhaust chamber 6b communicates with the exhaust chamber 11 of the regenerator 1 and n/2 supply communicating holes 5 by which the supply chamber 6a communicates with the supply chamber 12 of the regenerator 1 are alternately provided, and the exhaust communicating hole 4 and the supply communicating hole 5 must be provided with an angle α represented by the following formula 1 therebetween:

$$\frac{1}{n-1}\left\{360° - \left(\frac{360°}{n+1} + \frac{\beta_1+\beta_2}{2}\right)\right\} > \qquad (1)$$

$$\alpha > \frac{360°}{n+1} + \frac{\beta_1+\beta_2}{2}$$

where $\beta_1$ represents a central angle which is circumscribed by the communicating hole for the high-temperature fluid from a rotational center 0 of the changeover portion, and $\beta_2$ represents a central angle which is circumscribed by the communicating hole for the low-temperature fluid from the rotational center 0 of the changeover portion. Further, dimensions of the supply communicating hole 5 and the exhaust communicating hole 4 must satisfy the relation of the following formula 2:

$$\frac{360°}{n+1} > \frac{n}{2}(\beta_1+\beta_2) \qquad (2)$$

Here, it is preferable to set the angle α in such a manner α=360°/n is satisfied. With such a setting, since the respective exhaust communicating holes 4 and the respective supply communicating holes 5 are provided at equal intervals, thereby facilitating the design of a position of each communicating hole and the boring process.

Further, in the case where a plurality of units are provided, a vacant chambers 10 through which no fluid always flow are formed between the respective units, a total number of chambers being Z, and each exhaust communicating hole 4 and each supply communicating hole 5 are provided with an angle α having the relation represented by the following formula 3 therebetween:

$$\frac{1}{n-1}\left\{\frac{360°}{a} - \left(\frac{1}{a}\cdot\frac{360°}{n+1} + \frac{\beta_1+\beta_2}{2}\right)\right\} > \qquad (3)$$

$$\alpha > \frac{1}{a}\cdot\frac{360°}{n+1} + \frac{\beta_1+\beta_2}{2}$$

Also, dimensions of the exhaust communicating hole 4 and the supply communicating hole 5 satisfy the relation represented by the following formula 4:

$$\frac{1}{a} \cdot \frac{360°}{n+1} > \frac{n}{2} (\beta_1 + \beta_2) \qquad (4)$$

For example, if n=4 and a=1, two exhaust communicating holes $4_{-1}$ and $4_{-2}$ and two supply communicating holes $5_{-1}$ and $5_{-2}$ are alternately provided as shown in FIG. 6(A). Further, a vacant chamber 10 having no communicating hole is formed between the exhaust communicating hole $4^{-1}$ which is placed at the forefront in the rotating direction and the supply communicating hole $5_{-2}$. In this case, as shown in FIG. 6(B), if it is assumed that all the communicating holes, i.e., the supply communicating holes $5_{-1}$ and $5_{-2}$ and the exhaust communicating holes $4^{-1}$ and $4_{-2}$ are concentrated in one chamber, all the holes can be accommodated in one chamber without overlapping in the radial direction. In this example, although the supply communicating holes $5_{-1}$ and $5_{-2}$ and the exhaust communicating holes $4_{-1}$ and $4_{-2}$ have substantially the same dimension and shape, the present invention is not restricted to this configuration, and the size or shape of the supply communicating hole may differ from that of the exhaust communicating hole, or all the communicating holes may have different sizes or shapes if necessary.

Figure 4:
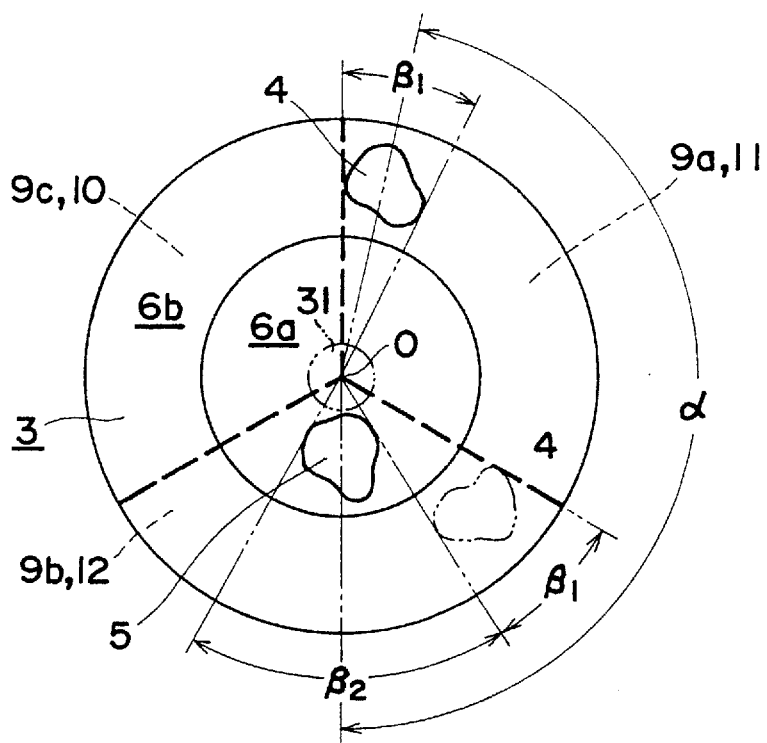
FIG. 4 is an explanatory view showing another example of the exhaust communicating hole and the supply communicating hole.

Furthermore, the exhaust communicating holes 4, $4_{-1}$, $4_{-2}$, ..., $4_{-n}$ and the supply communicating holes 5, $5_{-1}$, $5_{-2}$, ..., $5_{-n}$ are not limited to the circular shape shown in FIG. 3, and the present invention can be embodied if the communicating holes have the asymmetrical shapes shown in FIG. 4 as well as the triangular shape, the rhomboidal shape, the elliptical shape or the rectangular shape. In general, opening areas of the supply communicating hole and the exhaust communicating hole are set in such a manner that an amount of the combustion air is substantially balanced with an amount of the combustion exhaust gas. However, the opening area of one communicating hole may be set larger than that of the other communicating hole according to circumstances. For example, when a number of exhaust chambers for passing the combustion exhaust gas, whose volume becomes greater than that of the combustion air, therethrough is set larger than a number of supply chambers for passing the combustion air therethrough, the exhaust velocity can be extremely reduced as compared with the jet velocity of the combustion air, and occurrence of the short pass such that the combustion air flows into the exhaust system immediately after injection can be thereby suppressed. Furthermore, in the case where the size of the exhaust communicating hole 4 is substantially the same with that of the supply communicating hole 5, it is preferable that the combustion gas which has been expanded by combustion is exhausted outside of the furnace without passing through the regenerator 1 and supplied to other heat treatment facilities, a convective regenerator, an economizer, or heating facilities to be utilized as a heat source. Note that the relations represented by the above-described formulas 1 to 4 can be attained even if the communicating holes have any shape other than the circular shape. The $\beta_1$ is a central angle circumscribed by the exhaust communicating hole 4 from the rotational center 0 of the changeover means 3, while the $\beta_2$ represents a central angle circumscribed by the inlet communicating hole 5 from the rotational center of the changeover means 3.

Moreover, the angle $\alpha$ provided between, e.g., the exhaust communicating hole $4_{-1}$ and the supply communicating hole $5_{-1}$ which are arranged adjacent to each other in the circumferential direction is determined in such a manner that these holes do not simultaneously communicate with the same chamber/compartment of the regenerator 1. Therefore, assuming the leading exhaust communicating hole $4_{-1}$ is regarded as a reference, when the leading exhaust communicating hole $4_{-1}$ approaches to a partition 8, the supply communicating hole $5_{-1}$ in the adjacent chamber is placed at a position apart from the partition 8 by at least a length of the exhaust communicating hole $4_{-1}$, and the exhaust communicating hole $4_{-2}$ in the chamber adjacent that of the communicating hole $5_{-1}$ is placed at a position apart from the partition 8 of the same chamber by at least a length of the exhaust communicating hole $4_{-1}$ and that of the supply communicating hole $5_{-1}$. Also, the supply communicating hole $5_{-2}$ in the fourth chamber is placed at a position apart from the partition 8 of the same chamber by lengths of three holes, i.e., the exhaust communicating hole $4_{-1}$ the supply communicating hole $5_{-1}$ and the exhaust communicating hole $4_{-2}$. In other words, as shown in FIG. 6(A), when the leading exhaust communicating hole $4_{-1}$ approaches to inside of the next vacant chamber 10, the supply communicating hole $5_{-1}$ is yet to reach the partition 8 between the chamber $11_{-1}$ and the chamber $12_{-1}$ (the following chamber) adjacent thereto, and only the exhaust communicating hole $4_{-1}$ communicates with the two chamber simultaneously so as to extend over the front vacant chamber 10. Further, when the position of the leading exhaust communicating hole $4_{-1}$ has been completely changed to the front chamber which was the vacant chamber 10, the chamber $11_{-1}$ in which the leading exhaust communicating hole $4_{-1}$ existed becomes vacant. The supply communicating hole $5_{-1}$ in the adjacent chamber $12_{-2}$ following the chamber $11_{-1}$ then reaches the chamber $11_{-1}$, and only the second supply communicating hole $5_{-1}$ changes its position to the chamber $11_{-1}$ which is currently vacant so as to extend over the two chambers $11_{-1}$ and $11_{-2}$. In this way, the third exhaust communicating hole $4_{-2}$ and the fourth supply communicating hole $5_{-2}$ are sequentially moved to the respective chambers ahead thereof, thereby switching flows of the fluid. Namely, the exhaust communicating holes $4_{-1}$ and $4_{-2}$ and the supply communicating holes $5_{-1}$ and $5_{-2}$ are provided with such a positional relation as that the exhaust air and the inlet air are changed over in such a manner that the vacant chamber 10 relatively rotates in a direction opposed to that of the changeover means 3.

The changeover means 3 is rotatably supported by the outlet/inlet means 6 and the bearing means 15 in this embodiment. In addition, the changeover means 3 is so provided as to be capable of continuous or intermittent rotation by a driving mechanism. Although the driving mechanism is not restricted to a certain type, a gear 22 may be formed to a peripheral edge of the disc type changeover means 3 and a motor 21 having a drive gear 20 engaged with the gear 22 may be provided around the changeover means 3 to drive motor in this embodiment, for example. Of course, the changeover means is not limited to this configuration and it may be rotated by a friction wheel pressed against the peripheral edge of the changeover means 3. Note that scaling members 18 and 19 are provided between the changeover means 3 and a casing 13b accommodating the regenerator 1 and the dividing means 2 and between the changeover means 3 and the dividing means 2 for sealing. In this example, since the changeover means 3 is provided on the upstream side of the regenerator 1 as viewed from the flow of the combustion air and provided on the downstream side of the regenerator 1 as viewed from the flow of the combustion exhaust gas, the changeover means 3 is exposed to the fluid which is yet to be heated or has been cooled down and the sealing mechanism is not hence heated, thereby realizing the long duration of life.

Incidentally, although not shown, the exhaust system 34 and the supply system 33 are connected to a forced draft fan and an induced draft fan. In addition, an ignition burner 37 for starting the operation may be provided if necessary.

The fuel nozzle 31 is so disposed as to be directly exposed to or protrude into the furnace 35 through the regenerator 1. A small gap 24 is formed between the fuel nozzle 31 and the regenerator 1, and a part of the combustion air flows through the gap 24 as a cooling fluid. It is needless to say that the cooling air do not flow according to circumstances. More particularly, the fuel nozzle 31 is so provided as to pierce through the center of the outlet/inlet means 6, the center of the changeover means 3, the center of the dividing means 2 and the center of the regenerator 1 so that its fuel injection opening 26 protrudes inside of the furnace 35 or the burner throat 30, and the nozzle 31 is supported by the casing 13a and others. In this example, the injection opening is provided in the center of a tip of the nozzle 31 in the axial direction.

Further, in front of the regenerator 1 and the fuel nozzle 31 is arranged a burner tile 32 whose passage cross section narrows toward the tip thereof and around which a plurality of by-pass holes 25 which pass the combustion exhaust gas therethrough for exhaust are formed. The burner tile 32 is not necessarily provided, but the combustion air A injected from the regenerator 1 can be prevented from diffusing by provision of the burner tile 32, and the combustion exhaust gas can be attracted from the by-pass holes 25 by the injection energy of the combustion air to cause the exhaust gas recirculation around the fuel jet, whereby Nox can be reduced by the hydrocarbon radical generated in the fuel jet. Furthermore, a part of the combustion exhaust gas attracted in the burner throat 30 through the by-pass holes 25 is accompanied by the combustion air to increase a volume of the combustion gas. The combustion gas can therefore reach a distant position with great force.

According to the regenerative burner having the above-mentioned arrangement, combustion with NOx reduced can be attained in the following manner.

A detailed description will be given as to the operation for changing between the air and the exhaust in the fuel with reference to FIGS. 1 and 3 hereinbelow. When the combustion air A is first led in the supply chamber 6a of the outlet/inlet means 6, the combustion air A flows into the second chamber 9b of the dividing means 2 through the supply communicating hole 5 and enters a corresponding chamber/compartment 12 of the regenerator 1. Here, since the corresponding compartment/chamber of the regenerator 1 is heated by heat of the high-temperature gas/combustion exhaust gas E which has passed therethrough before changeover, the combustion air A passing therethrough takes heat from the regenerator 1 and the temperature thereof increases, namely, it becomes close to a temperature of the combustion gas which heated the regenerator 1. The combustion air A whose temperature has become approximately 1000° C. is injected in parallel with the fuel F from the circumferential portion of the fuel nozzle 31 provided in the center of the regenerator 1 directly into the furnace 35. Meanwhile, the combustion exhaust gas F in the furnace 35 is led into the corresponding compartment 11 of the regenerator 1, which communicates with the exhaust chamber 6b of the outlet/inlet means 6 through the exhaust communicating hole 4, by the operation of the induced draft fan of the exhaust system 34. The combustion exhaust gas whose temperature is reduced by heating the compartment 11 of the regenerator 1 is fed into the first chamber 9a of the dividing means 2 and exhausted into the exhaust chamber 6b through the exhaust communicating hole 4.

Subsequently, the exhaust communicating hole 4 first reaches the third chamber 9c of the dividing means, which is positioned on the left side of the hole 4, when the changeover means 3 is continuously or intermittently rotated counterclockwise from the position illustrated in FIG. 1, whereby the first chamber 9a and the third chamber 9c simultaneously communicate with the exhaust chamber 6b. The combustion exhaust gas E passes through the first compartment and the third compartment (the portion designated by a reference numeral 10 in FIG. 3) and flows into the first chamber 9a and the third chamber 9c of the dividing means 2 to be fed into the exhaust chamber 6b connected to the both chambers 9a and 9c through the exhaust communicating hole 4. The combustion exhaust gas E is then exhausted. Thereafter, when the position of the exhaust communicating hole 4 is completely changed to the third chamber 9c (the portion which has been a vacant chamber represented by the reference numeral 10 in FIG. 3), the supply communicating hole 5 positioned in the second chamber 9b is changed to the first chamber 9a (the chamber denoted by a reference numeral 11 in FIG. 3), and the area partitioned by the second chamber 9b (the chamber designated by a reference numeral 12 in FIG. 3) becomes vacant. In other words, the combustion exhaust gas E flows into the vacant chamber 10 to which no fluid has been supplied, while the combustion air A flows into the chamber 11 to which the combustion gas E has been fed, and no fluid flows into the chamber 12 to which the combustion air A has been led. The regenerator 1 is therefore heated by heat of the combustion exhaust gas E, and the combustion air A passing through the heated regenerator 1 is heated by heat of the regenerator 1. At this stage, since flows of the fluid are changed over while communication with each chamber is attained by using the vacant chamber 10 even when one communicating hole extends over the two chambers, flows of the fluid do not stop. Further, the flow of the combustion exhaust gas E is continuously changed to that of the combustion air A or vice versa without interrupting the changeover operation. The combustion air A is thus supplied into the furnace 35 through the heated regenerator 1 as hot air whose temperature is close to that of the exhaust gas, e.g., 1000° C.

The high-temperature combustion air A corresponding to the substantially-full quantity of the combustion air and the fuel F injected from the fuel nozzle 31 are separately injected to the furnace 35 and subjected to combustion while extending in the furnace 35. Since the combustion air A and the fuel F rapidly reduce their jet velocities and extend an area in which they are mixed together at this stage, conditions with which combustion is essentially difficult are provided. However, the combustion air A itself has such a high temperature of approximately 1000° C. above the ignition temperature of the gas fuel, combustion is easily enabled under such conditions. That is, slow combustion is performed. In case of slow combustion, generation of NOx is reduced. The combustion gas generated by slow combustion is subjected to heat utilization in the furnace 35 as described above and thereafter exhausted outside of the furnace through an area which is a part of the regenerator 1. Here, in regard of a changeover cycle of the regenerator 1, it is preferable to carry out changeover in a relatively-short time in order to improve the heat efficiency. For example, the changeover means 3 may be rotated by a length of one chamber/compartment every time 10 to 90 seconds, or more preferably, 10 seconds lapse.

Figure 7:
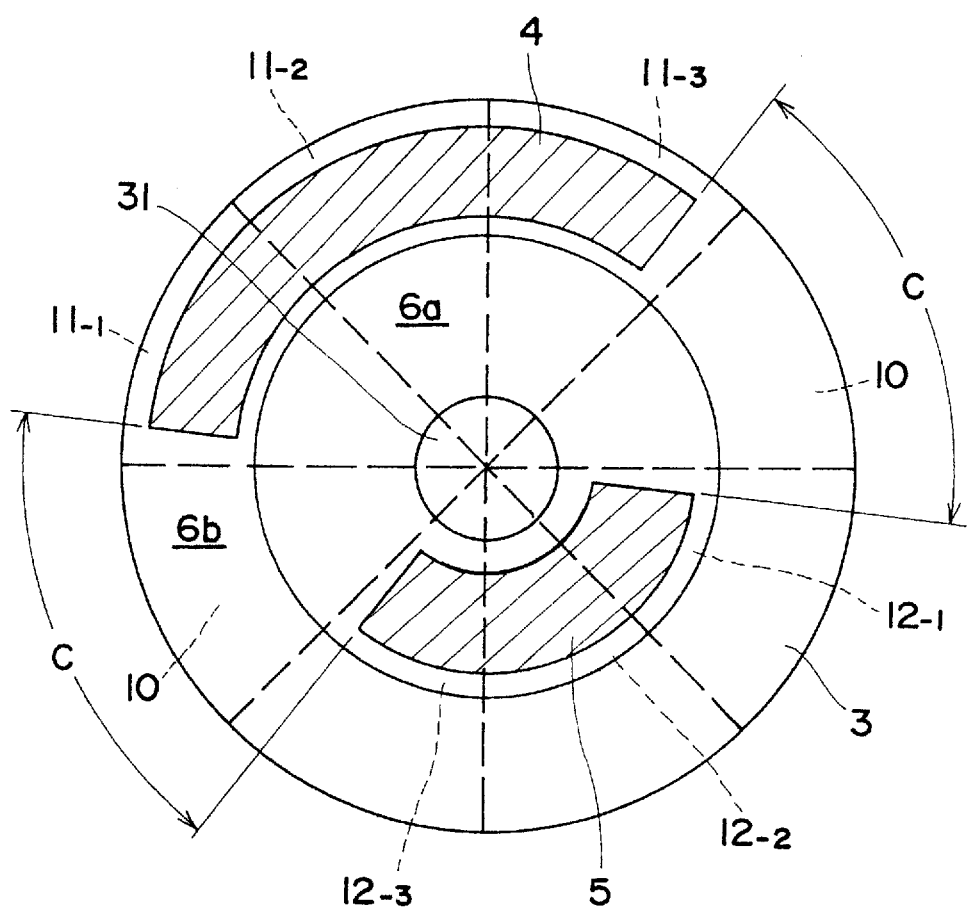
FIG. 7 is a principle view showing another embodiment of changeover means.
Figure 8:
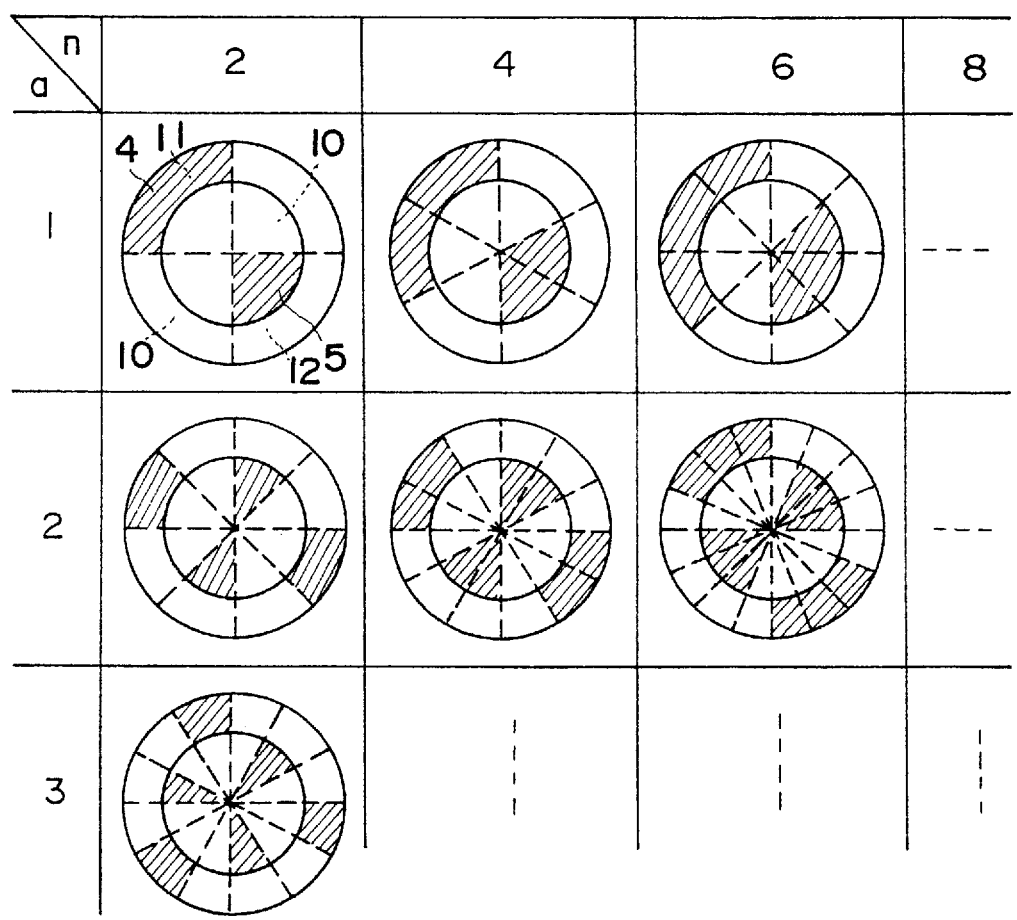
Figure 9:
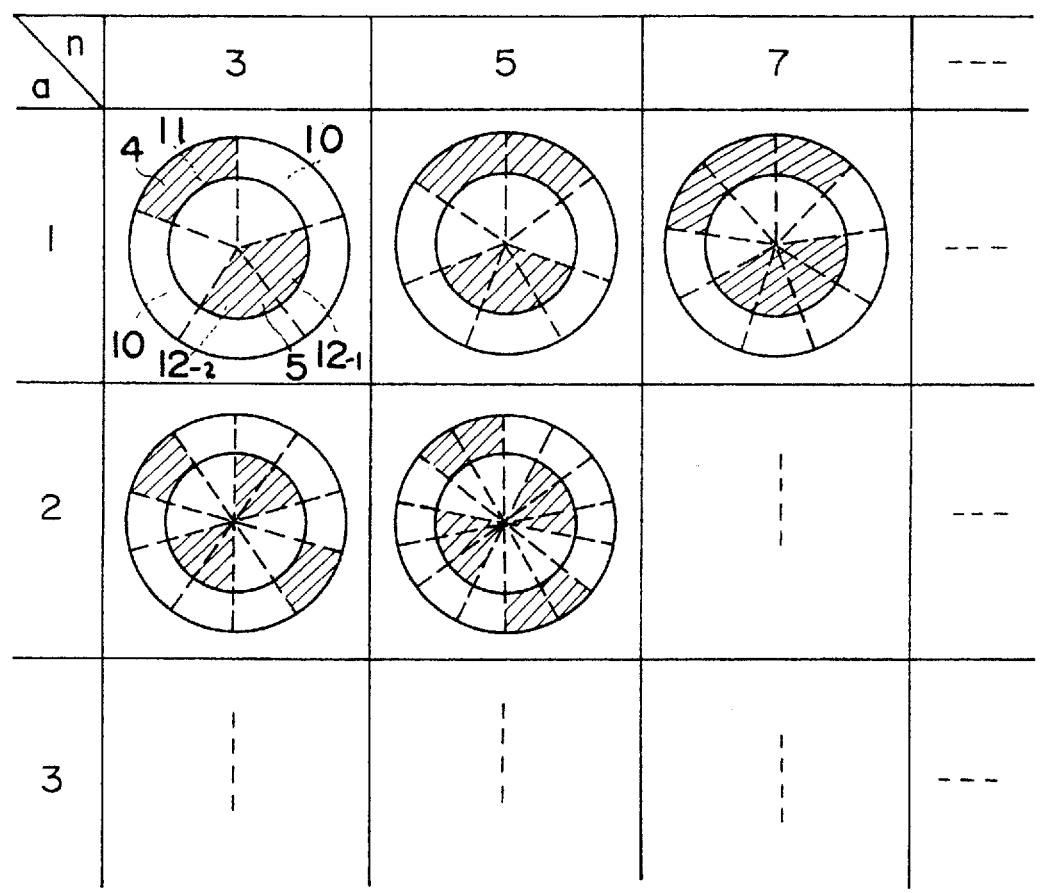
FIG. 9 is a chart showing arrangement of chambers with the relation between a number of chambers n through which the fluid flows and a number of units a in the case where a number of exhaust communicating holes are different from that of supply communicating holes.

FIGS. 7 to 9 show another embodiment of the changeover means 3. The changeover means 3 of this embodiment has the exhaust communicating hole 4 and the supply communicating hole 5 having such a size that each hole extends over the entire area of each chamber of the regenerator 1 which is partitioned into N chambers, and the communicating holes 4 and 5 are arranged with such a relation that at least one vacant chamber can be provided between a chamber through which the combustion exhaust gas E flows and a chamber through which the combustion air A flows. That is, the regenerator 1 is substantially-equally partitioned into N (N=n+2, where n is a positive integer equal to or above 2 and corresponds to a number of chambers through which the fluid constantly flows) chambers in the circumferential direction thereof by being divided by the dividing means 2 or by dividing the regenerator itself as similar to the foregoing embodiment, so that the fluid flows through each chamber in the axial direction. In this example, in regard of a number of chambers partitioned in the regenerator 1, when it is assumed that the supply chamber 12 through which the combustion air flows and the exhaust chamber 11 through which the combustion exhaust gas flows form a pair, two vacant chambers (the chambers through which no fluid flows) 10 are combined to at least one pair, whereby a minimum number of chambers/compartments is four. A number of exhaust chambers 11 is not necessarily equal to that of the supply chambers 12. As shown in FIG. 9, a number of the exhaust chambers 11 may be smaller or larger than that of the supply chambers 12 according to circumstances. In such a case, if a percentage of the exhaust capacity is different from that of the air capacity, an area of a heating surface of the regenerator to be used can be changed in accordance with each percentage, and the appropriate heat balance can be advantageously maintained. When a number of the exhaust chambers 11 is larger than that of the supply chambers 12, since the speed for exhausting the combustion exhaust gas can be greatly slower than that for injecting the combustion air, the short pass by which the combustion air is exhausted immediately after injection can be prevented from occurring. Further, the fluid may flow through a plurality of chambers/compartments by one communicating hole at the same time. For example, as shown in FIG. 7 or 8, 2 to 3 or more chambers/compartments may be simultaneously connected to one communicating hole. In this case, the size of the vacant chamber required for changing becomes small to shorten the change-over time. Furthermore, assuming that N chambers form one unit, a plurality of units may be formed. That is, a total number of chambers, i.e., Z can be represented by an equation Z=a·N (where a is a positive integer representing a number of units except 0). In this case, a position of each of the communicating holes 4 and 5 is determined in such a manner that each exhaust chamber 11 and each supply chamber 12 are alternately arranged with one vacant chamber 10 therebetween. FIGS. 8 and 9 show this positional relation. Note that the fuel nozzle 31 is not illustrated in FIGS. 8 and 9 for convenience'sake.

The changeover means 3 has supply communicating holes 5 by which one to two or more chambers/compartments 12, $12_{-1}, 12_{-2}, \ldots, 12_{-n}$ of the regenerator 1 communicate with the supply chamber 6a and exhaust communicating holes 4 by which one to two or more chambers/compartments 11, $11_{-1}, 11_{-2}, \ldots, 11_{-n}$ communicate with the exhaust chamber 6b in accordance with a number of units a. For example, since a number of units a is one in FIG. 7, the changeover means 3 has one supply communicating hole 5 and one exhaust communicating hole 4. In addition, it is necessary to satisfy such a positional relation as that at least one vacant chamber 10 can be provided between the exhaust communicating hole 4 and supply communicating hole 5. That is, in case of one unit, the supply communicating hole 5 and the exhaust communicating hole 4 are arranged with an angle C represented by the following formula 5 therebetween:

$$\frac{360°}{N} < C < 2 \cdot \frac{360°}{N} \tag{5}$$

Here, the angle C may be preferable set so as to be slightly larger than an angle of the vacant chamber, i.e., (360°/(n+2)). In this case, mixture of the inlet air and the exhaust can be completely prevented and the pressure loss can be suppressed to the minimum level. Further, when a plurality of units are provided, an angle C represented by the following formula C is set between each exhaust communicating hole 4 and each supply communicating hole 5 so that the exhaust communicating holes 4 and the supply communicating holes 5 are alternately arranged in accordance with a number of units:

$$\frac{360°}{Z} < C < 2 \cdot \frac{360°}{Z} \tag{6}$$

The flow of the fluid is switched by the changeover means having the above-described arrangement when both the exhaust communicating hole 4 and the supply communicating hole 5 change their positions to adjacent vacant chambers 10, respectively. When the exhaust communicating hole 4 and the supply communicating hole 5 are completely moved to the chambers/compartments, which have been vacant chambers, ahead thereof respectively, the chambers/compartment which have communicated with the exhaust communicating hole 4 and the supply communicating hole 5 become vacant. For example, in case of one unit and eight chambers shown in FIG. 7, the chambers/compartments $11_{-3}$ and $12_{-3}$ which are rearmost in the rotational direction become vacant. At this stage, although the exhaust communicating hole 4 and the supply communicating hole 5 simultaneously extend over the current chambers/compartments $11_{-1}, 11_{-2}$ and $11_{-3}$ and the current chambers/compartments $12_{-1}, 12_{-2}$ and $12_{-3}$ as well as new two chambers/compartments 10, since positions of these holes are changed while supplying the fluid to a plurality of compartments and they uses the vacant chambers 10, the flow of the fluid is not interrupted. Also, since the exhaust communicating hole 4 uses a compartment which precedes the compartment that the supply communicating hole 5 has reached, the combustion exhaust gas to be emitted is not mixed with the combustion air to be supplied in the same compartment.

Figure 11:
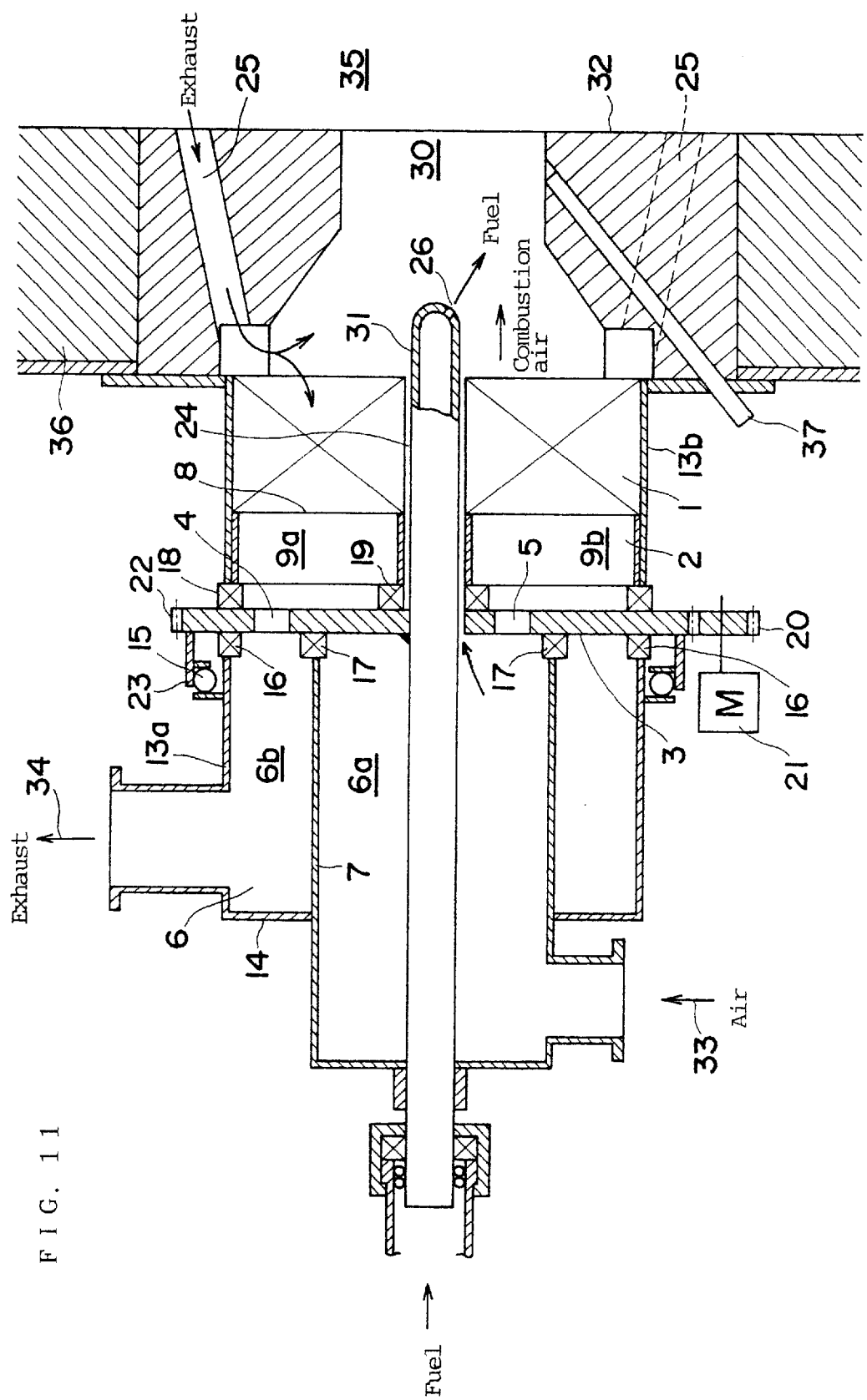
FIG. 11 is a vertical sectional view showing still another embodiment of the regenerative burner according to the present invention.

Moreover, as shown in FIG. 11, the changeover means 3 and the fuel nozzle 31 may be united into one body by welding or the like so that they can integrally rotate, while the fuel injection opening 26 of the fuel nozzle 31 may be provided to direct toward a radial direction of the supply communicating hole 5 of the changeover means 3, in order that the changeover means 3 and the fuel nozzle 31 can simultaneously rotate to constantly inject the fuel F into the flow of the air A. In this case, the fuel jet is combined with the straightforward combustion air jet as the cross-wind jet. At this stage, a pair of circulation flows which are vortical regions opposed to each other are generated in the combustion air jet by the cross-wind jet/fuel jet, and the fuel jet is taken into inside of the jet of the combustion air. The high-density region of the combustion air jet is thereafter complicatedly diffused in the cross section by a plurality of large and small vortexes produced inside of each vortical region and, at the same time, the fuel jet taken in the central portion of the jet is dispersed and diffused. That is, after the fuel jet is taken into the combustion air jet, it is gradually extended within the jet and mixed with the high-temperature combustion air to cause combustion in the combustion air jet. Meanwhile, combustion occurs on the surface of the fuel jet, which is to be mixed with the combustion air, to generate NOx, but the NOx is taken into the fuel jet by the circulation flows to be rapidly reduced.

Figure 12:
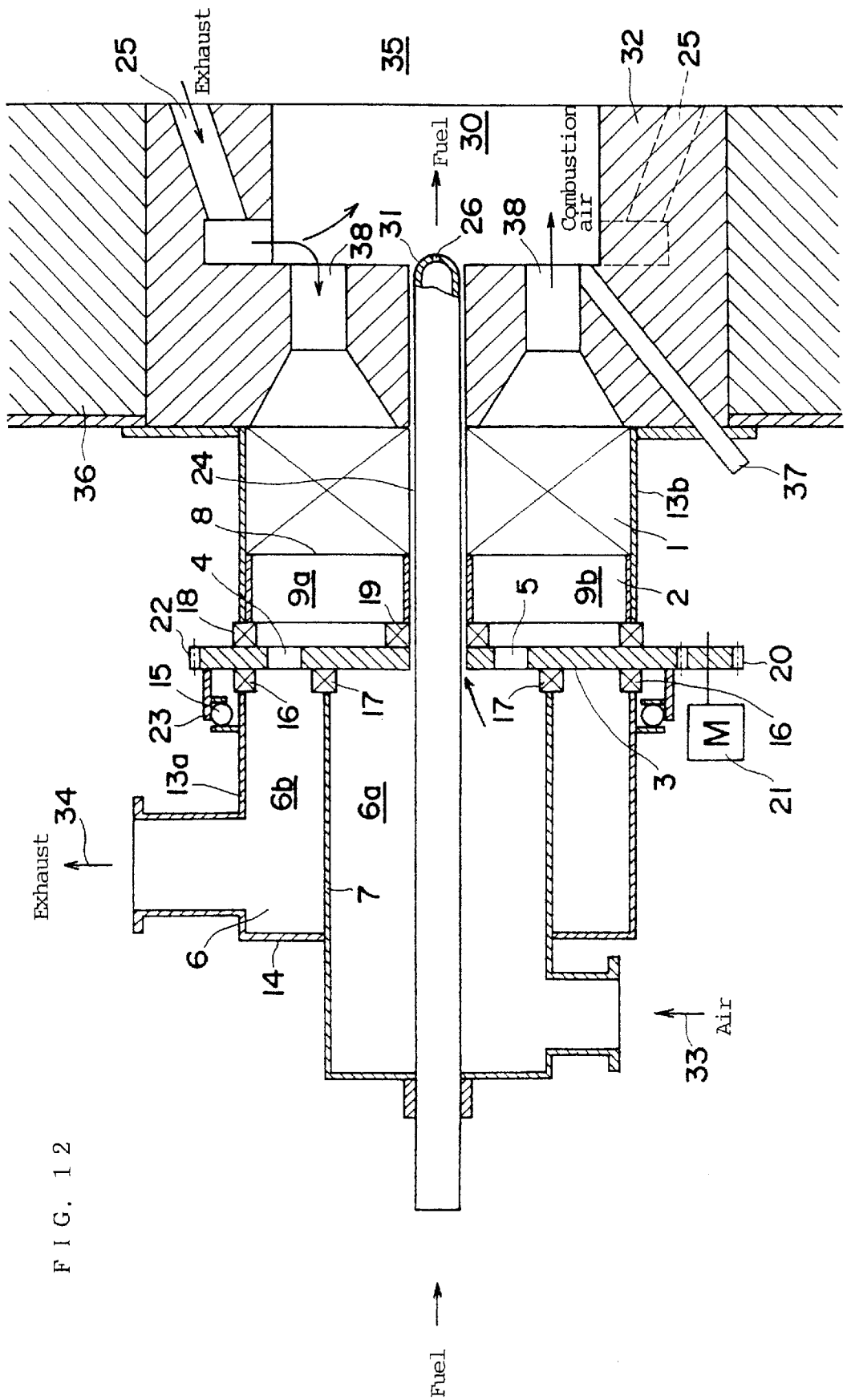
FIG. 12 is a vertical sectional view showing a further embodiment of the regenerative burner according to the present invention.

FIG. 12 shows another embodiment according to the present invention. According to regenerative burner of this embodiment, independent nozzles 38 whose number is the same with that of partitioned chambers N of the regenerator 1 are provided on an outlet side (a side closer to the furnace 35) of the regenerator 1 of the burner shown in FIG. 2. These nozzles 38 are opened toward the burner throat 30 within the burner tile 32, respectively. In this embodiment, the nozzles 38 are integrally formed with the burner tile 32. The present invention is not, however, restricted to this structure, and the nozzles 38 and the burner tile 32 may be formed of different material. To the burner tile 32 are formed a plurality of by-pass holes 25 for directly leading the combustion exhaust gas in the furnace 35 to the inner part of the burner throat 30. The by-pass holes 25 may be preferably provided in accordance with the respective nozzles 38. Note that the rear end of each nozzle 38 is enlarged to occupy areas of the chambers/compartments 10, 11 and 12 of the regenerator 1 while the front end of the same is narrowed to a predetermined dimension. With such a configuration, the jet velocity (momentum) of the combustion air can be controlled without restraint by varying the size of an opening of each nozzle 38, and the shape and property of the flame can be thereby changed. For example, the strong flame or weak flame can be realized. Further, the combustion exhaust gas in the furnace is attracted into each by-pass hole 25 by the injection energy of the combustion air and mixed with the combustion air to be again injected into the furnace. Further, the volume of the combustion gas becomes large to increase the injection momentum, and recirculating combustion is generated to reduce the NOx.

Figure 13:
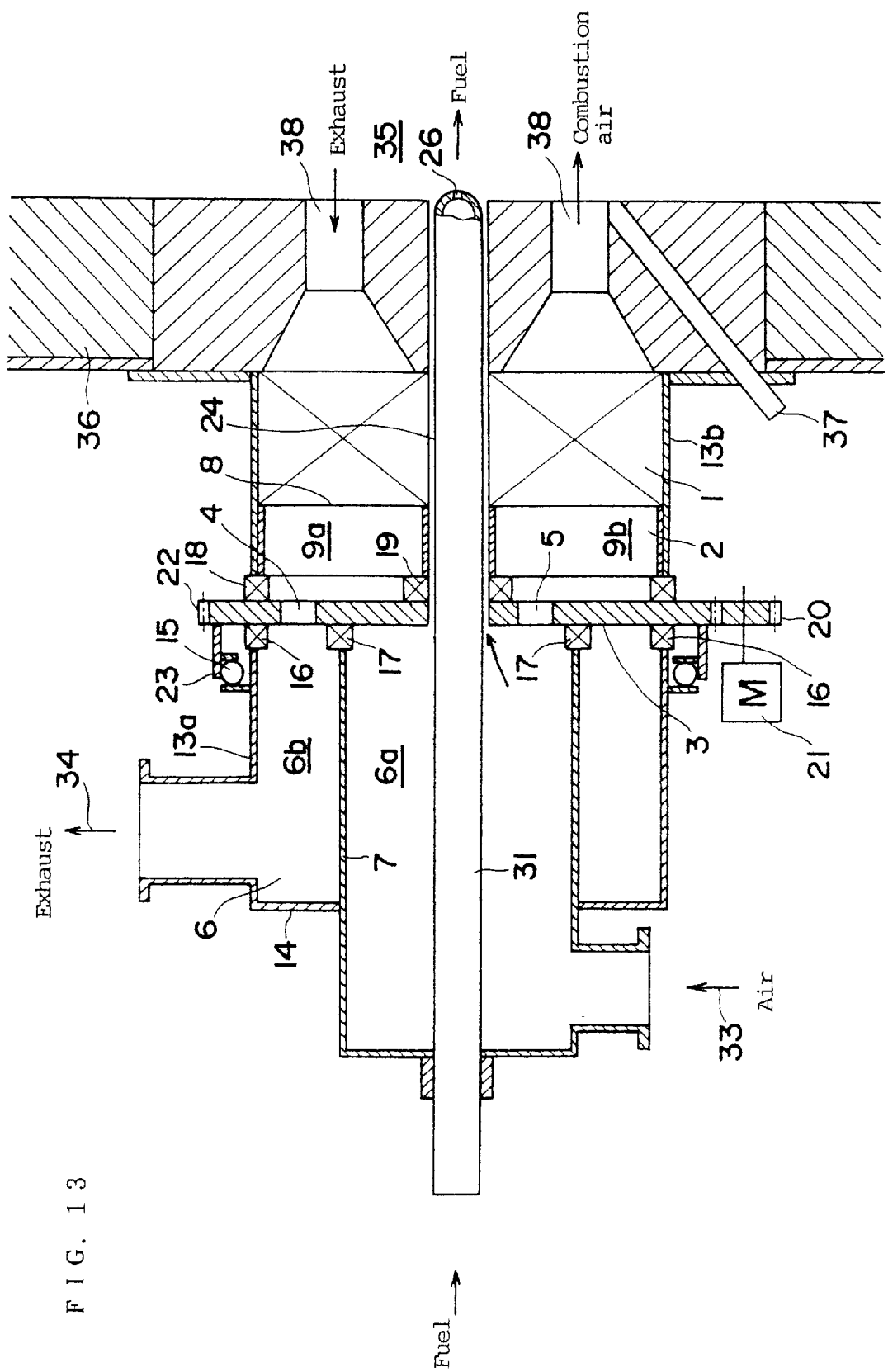
FIG. 13 is a vertical sectional view showing a still further embodiment of the regenerative burner according to the present invention.

FIG. 13 shows still another embodiment according to the present invention. According to the regenerative burner of this embodiment, the burner tile 32 of the burner of the embodiment shown in FIG. 12 is removed, and the nozzles 38 connected with respective compartments/chambers of the regenerator 1 directly face to inside of the furnace 35 so that the combustion air is directly injected into the furnace 35 from each nozzle 38 while the combustion exhaust gas is attracted from each nozzle 38 to inside of the regenerator 1. In this case, the jet velocity of the combustion air can be controlled by setting an area of an opening of each nozzle 38 to a predetermined value, and the relative velocity of the fuel to the air can be changed to vary the shape or strength of the flame, as similar to the embodiment shown in FIG. 12. The air flow velocity has great influence on the shape of the flame or the like.

Figure 14A:
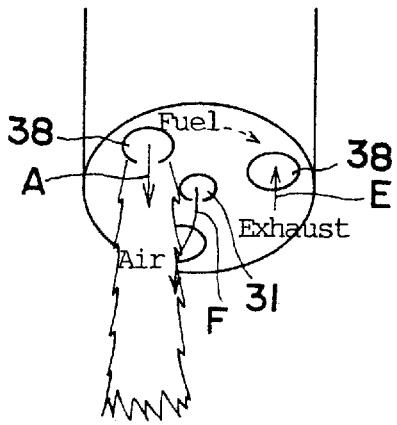
FIGS. 14 are explanatory views of behaviors (A) to (C) such that a flame rotates in the circumferential direction in the regenerative burner used in the embodiment illustrated in FIG. 13.
Figure 14B:
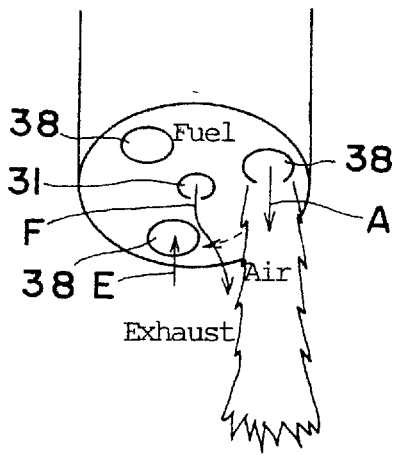
Figure 14C:
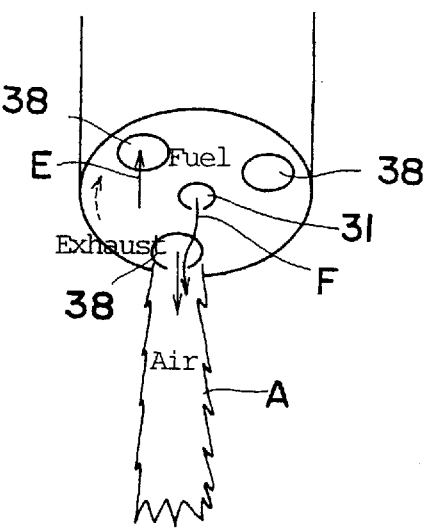

According to the burner having such an arrangement, the combustion air is injected from any one of the independent nozzles 38 by continuously or intermittently rotating the changeover means 3, while the combustion exhaust gas is attracted to the regenerator 1 through any one of the nozzles. Further, since flows of the combustion air and the combustion exhaust gas to the regenerator 1 are changed by rotation of the changeover means 3, the nozzle is sequentially changed over to another nozzle adjacent thereto. Thus, as shown in FIGS. 14(A) to (C), a position from which the combustion air is injected is sequentially shifted in the circumferential direction, and such a non-stationary flame as that a position of the flame is constantly shifted in the circumferential direction within the furnace 35 is formed. Since any portion locally having a high temperature is not formed with the non-stationary flame, if an object to be heated is placed around the burner, e.g., if the present invention is applied to a water tube boiler, a tube can be prevented from excessively being heated by the extremely-high temperature flame.

Furthermore, the heat exchange system which is made up of the outlet/inlet means, the changeover means and the regenerator incorporated in the respective above-mentioned embodiments can be used as an independent heat exchange system. That is, when the fuel nozzle 31, which is included in the embodiment shown in FIG. 1, piercing through the center of the heat exchange system is removed and the changeover means 3 and the outlet/inlet means 6 are provided on the downstream side of the regenerator 1 as well as the upstream side of the same, it is possible to constitute a regenerative heat exchange system for effecting heat exchange using the regenerator 1 by changing flowing directions of the fluid with respect to the regenerator 1 between the changeover means 3 on the upstream side of the regenerator 1 and the changeover means 3 on the downstream side of the same while fixing the flowing directions of the two types of the fluid connected to the outlet/inlet means 6 on the upstream side and the outlet/inlet means 6 on the downstream side without mixing the two types of the fluid together. Incidentally, in this regenerative heat exchange system, in order to eliminate such a misunderstanding as that the two types of fluid are restricted to, for example, the combustion air (low-temperature fluid) and the relatively-high-temperature combustion exhaust gas (high-temperature fluid) in the regenerative burner shown in FIGS. 1 through 14 and are not used in any other heat exchange system such as an exhaust heat recovery system, the supply chamber and the exhaust chamber of the outlet/inlet means are referred to as a low-temperature fluid chamber and a high-temperature fluid chamber and the supply communicating hole and the exhaust communicating hole of the changeover means are referred to as a low-temperature communicating hole and a high-temperature communicating hole for convenience' sake, as different from the heat exchange system described in connection with FIGS. 1 to 14, even though they are the similar means and designated by the same reference numerals.

Figure 15:
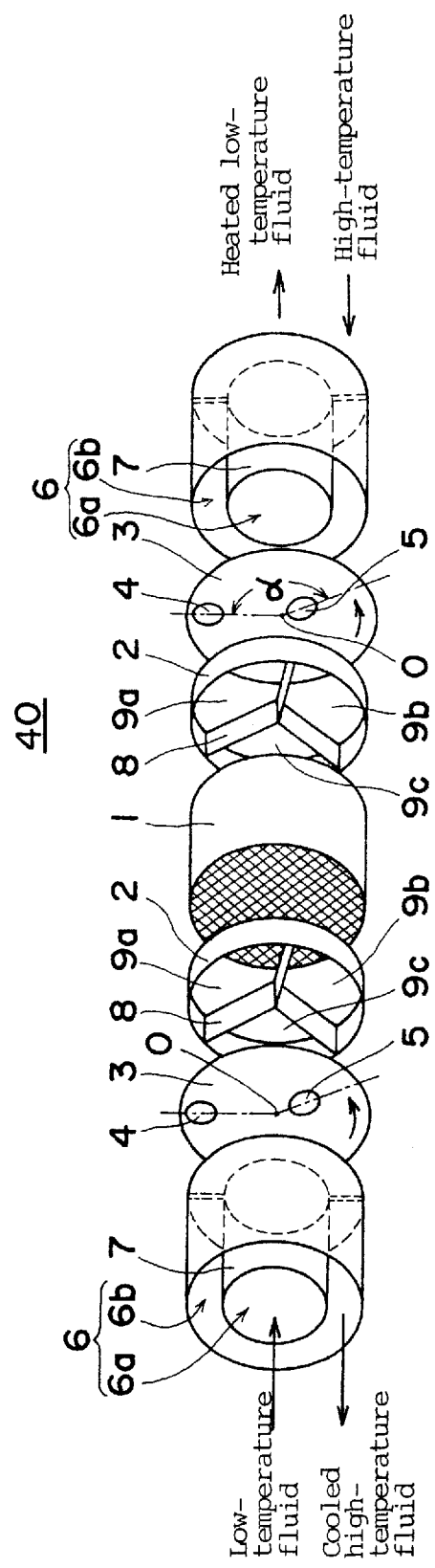
FIG. 15 is an exploded perspective view for explaining the basic structure when the present invention is embodied as a single regenerative heat exchange system.
Figure 16:
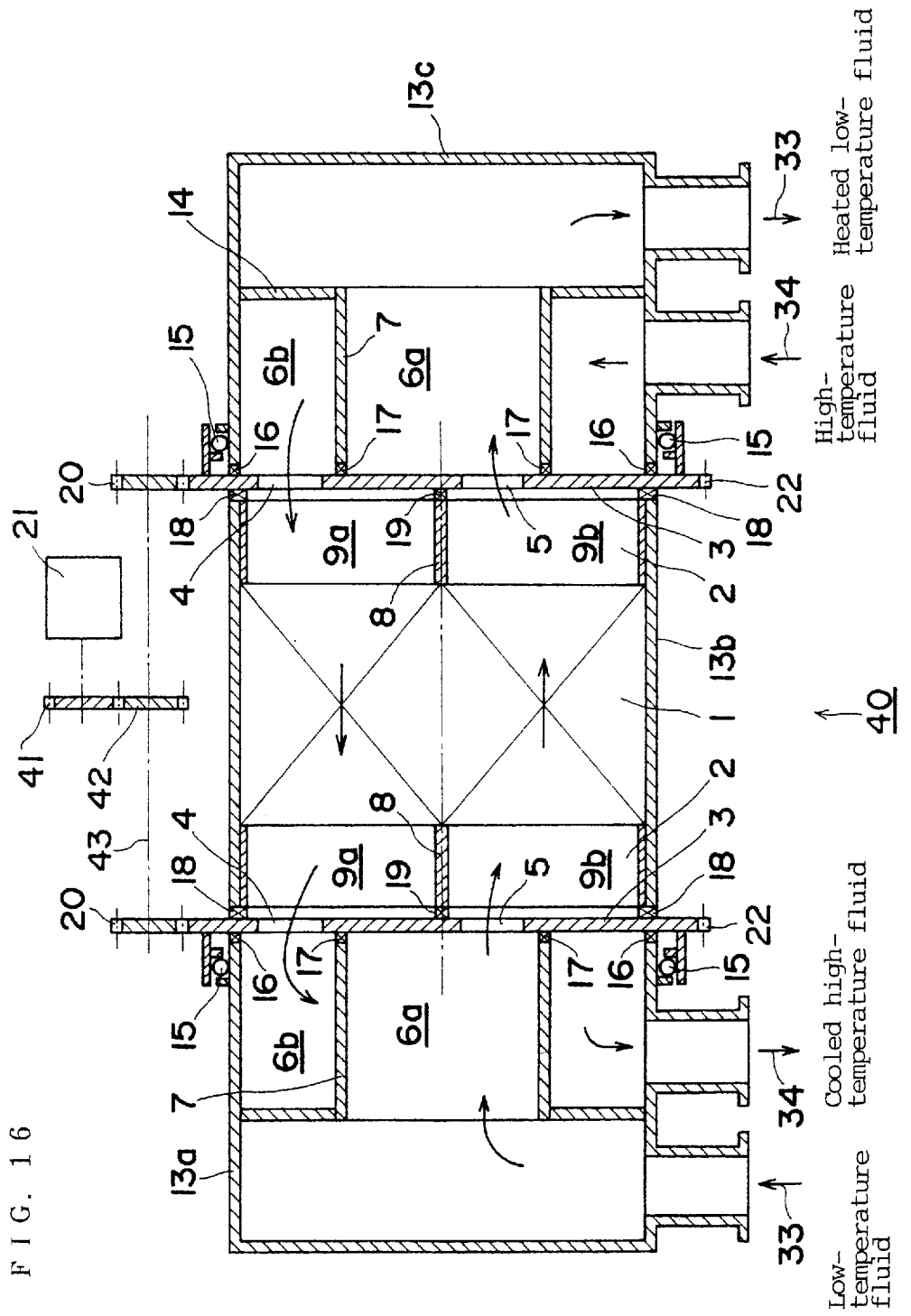
FIG. 16 is a sectional view showing a specific embodiment of the regenerative heat exchange system.

For example, as shown in FIGS. 15 and 16, a regenerative heat exchange system 40 according to the present invention includes: a regenerator 1 which are partitioned into three or more chambers in the circumferential direction thereof so that the fluid can pass through each chamber; double-pipe outlet/inlet means 6 which are connected to both opening ends of the regenerator 1 on the fluid-upstream side and the fluid-downstream side and partitioned into a low-temperature fluid chamber 6a and a high-temperature fluid chamber 6b by each annular partition wall 7; and changeover means 3 which are provided between the regenerator 1 and the respective outlet/inlet means 6 provided in front of and at the rear of the regenerator 1 and partially isolate the regenerator 1 from the respective outlet/inlet means 6, the regenerative heat exchange system 40 being designed so that the low-temperature fluid chamber 6a and the high-temperature fluid chamber 6b of the respective outlet/inlet means 6 in front of and at the rear of the regenerator 1 successively communicate with any chamber/compartment of the regenerator 1 by continuously or intermittently rotating the changeover means 3. Note that a low-temperature fluid system is connected to the low-temperature fluid chambers 6a of each outlet/inlet means 6 while a high-temperature fluid system is connected to the high-temperature fluid chamber 6b of the same and flowing directions of the fluid are fixed in the both outlet/inlet means 6. Further, to each of the both changeover means 3 are formed a low-temperature fluid communicating hole 5 by which the regenerator 1 communicates with the low-temperature fluid chamber 6a and a high-temperature fluid communicating hole 4 by which the regenerator 1 communicates with the high-temperature fluid chamber 6b.

In this example, the high-temperature fluid communicating hole 4 and the low-temperature fluid communicating hole 5 are formed with such a positional relation as that these holes do not simultaneously exist in the same chamber (any compartment designated by a reference numeral 10, 11, 12, $11_{-1}$, ..., or $12_{-3}$ in FIGS. 3 to 9) of the regenerator 1 and a chamber 10 through which the fluid does not flow is formed to at least one chamber of the regenerator 1 to which the high-temperature fluid communicating hole 4 and the low-temperature fluid communicating hole 5 are positioned. For instance, in regard of a number of chambers/compartments substantially-equally dividing the regenerator in the circumferential direction and the positional relation or the dimensions of the low-temperature fluid communicating hole 5 and the high-temperature fluid communicating hole 4, it is preferable to satisfy conditions which are the same with those represented by the formulas 1 and 2, the formulas 3 and 4, the formula 5 or the formula 6, as similar to the regenerative heat exchange system embodied in the regenerative burner shown in FIGS. 1 to 14. As a result, the high-temperature fluid chamber 6b and the low-temperature fluid chamber 6a of each outlet/inlet chamber provided on in front of or at the rear of the regenerator 1 communicate with different chambers/compartments 10, 11 and 12 of the regenerator 1 through the low-temperature fluid communicating hole 5 and the high-temperature fluid communicating hole 4 of each changeover means 3, and the low-temperature fluid and the high-temperature fluid thereby flow into the regenerator 1 without being mixed together. In other words, if the chambers/compartments communicating with the low-temperature fluid chamber 6a of each outlet/inlet means 6 and those communicating with the high-temperature fluid chamber 6b of the same are subsequently changed over, the high-temperature fluid and the low-temperature fluid flow in the same chamber/compartment of the regenerator 1 at different times, and each exchange is effected by taking heat from the regenerator 1, which has been heated by pass of the high-temperature fluid therethrough, by the low-temperature fluid. Further, since flows of the high-temperature fluid and the low-temperature fluid are changed over by using each vacant chamber 10, flows of the fluid are not reduced or stopped during change-over. In this case, flows of the two types of fluid are similarly changed over in accordance with the respective changeover means 3 as described with reference to FIGS. 3 to 9 except that the changeover means 3 are synchronized with each other in front of and at the rear of the regenerator 1 for change-over in such a manner that flows of the fluid are fixed on the inlet and outlet sides and the two types of fluid flow in or from the same passage through the same fluid chambers, thereby omitting the detailed description thereof.

Incidentally, since the changeover means 3 are provided on the upstream side (front side) and the downstream side (rear side) of the regenerator 1 respectively in this embodiment, they must be synchronized with each other to be rotated. Thus, each disc type changeover means 3 is rotatably supported by each outlet/inlet means 6 and each bearing means 15 and provided so as to be capable of continuously or intermittently rotating by a driving means. Although the driving means is not restricted to a certain type, it is constituted by a pair of gears 22 formed on the peripheral edges of the both changeover means 3, a pair of pinion gears 20 provided around the respective changeover means 3 and engaged with the gears 22, one shaft 43 connecting the gears 20 with each other, a pinion gear 42 fixed to the center of the shaft 43, a drive gear 41 engaged with the gear 42, and one motor 21 for rotating the drive gear 41, for example, in this embodiment. It is needless to say that driving mechanism is not restricted to this configuration, and rotational driving may be effected by using friction wheels pressed against the peripheral edges of the respective changeover means 3. Note that sealing members 18 and 19 are provided to seal between a casing 13b accommodating the regenerator 1 and two division chambers 2 therein and each changeover means 3 provided on the both sides of the casing 13b and between each changeover means 3 and each dividing chamber 2. Also, sealing members 16 and 17 are provided between the changeover means 3 and the casing 13a and between the changeover means 3 and the casing 13b in such a manner that the both changeover means 3 and the casings 13a and 13b can rotate.

Flows of the fluid in the changeover means 3 having the above-described structure are effected, when positions of both the high-temperature fluid communicating hole 4 and the low-temperature fluid communicating hole 5 are simultaneously changed to the vacant chambers 10 provided ahead thereof if the holes 4 and 5 have the positional relation shown in FIGS. 7 to 9, or when a position of either the high-temperature fluid communicating hole 4 or the low-temperature fluid communicating hole 5 is changed to the vacant chamber 10 provided ahead thereof if the holes 4 and 5 have the positional relation shown in FIGS. 3 to 6. For example, in the case where one unit and eight chambers are provided, when the high-temperature fluid communicating hole 4 and the low-temperature fluid communicating chamber 5 completely occupy the chambers/compartments which are provided ahead thereof and have been vacant, respectively, the chambers/compartments which have communicated with the high-temperature fluid communicating hole 4 and the low-temperature communicating hole 5 become vacant. That is, the chambers/compartments $11_{-3}$ and $12_{-3}$ which are the rearmost chambers in the rotational direction become vacant. At this stage, the high-temperature fluid communicating hole 4 extends over four compartments, i.e., the chambers/compartments $11_{-1}$, $11_{-2}$ and $11_{-3}$ and the new chamber/compartment 10 while the low-temperature fluid communicating hole 5 extends over four compartments, i.e., the chambers/compartments $12_{-1}$, $12_{-2}$ and $12_{-3}$ and the new chamber/compartment 10 and, since these holes 4 and 5 change their positions and use the vacant chambers 10 while supplying the fluid to a plurality of compartments at the same time, flows of the fluid are not interrupted. Further, since the front high-temperature fluid communicating hole 4 occupies a compartment preceding the compartment that the low-temperature fluid communicating hole 5 has reached, the high-temperature fluid and the low-temperature fluid, which are passing in directions opposed each other, are not mixed together in the same compartment.

According to the above-mentioned regenerative heat exchange system, since flows of the fluid can be changed by only mechanically rotating the changeover means without rotating the regenerator 1, flows of the fluid are not interrupted when changing the passages, and supply or exhaust of the fluid can be stabilized. Also, problems such as damages which may given to the regenerator or leakage of the fluid can be greatly reduced as compared to the case where the regenerator 1 itself is rotated. Further, since the both changeover means 3 can be sealed by being brought into contact with the regenerator 1, heat exchanger effectiveness can be largely improved without leakage of the fluid from the two passages thereof as compared with the system in which the regenerator is rotated, and it is possible to accurately control an amount of supply of the combustion air which has been preheated to a high temperature close to the that of the combustion exhaust gas when the present system is applied to the regenerative burner system. Furthermore, according to the regenerative heat exchange system, the facility cost can be extremely reduced as compared with the case where solenoid valves or four-way valves are used, and the system can be stably used for a long time.

The regenerative heat exchange system of the present invention having the above-described structure can be used in the burner system. Although the invention is applied to a burner which effects combustion within the furnace in the foregoing embodiment, the invention is not restricted to this configuration and it is understood that the invention can be similarly applied to a burner which performs combustion within a radiant tube.

Figure 17:
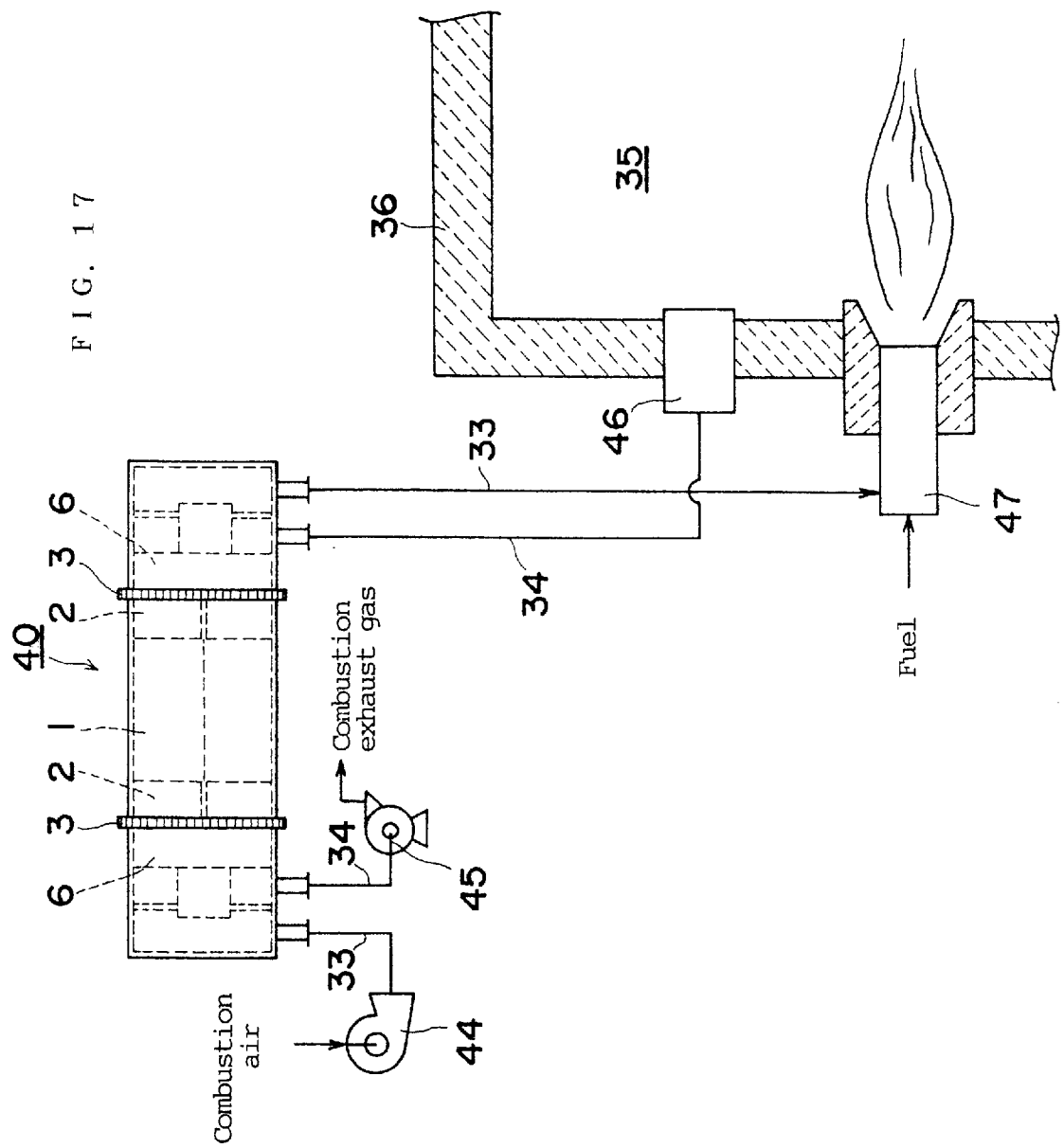
FIG. 17 is a schematic view showing one example of the regenerative combustion system to which the regenerative heat exchange system illustrated in FIG. 15 and 16 is adopted.
Figure 18:
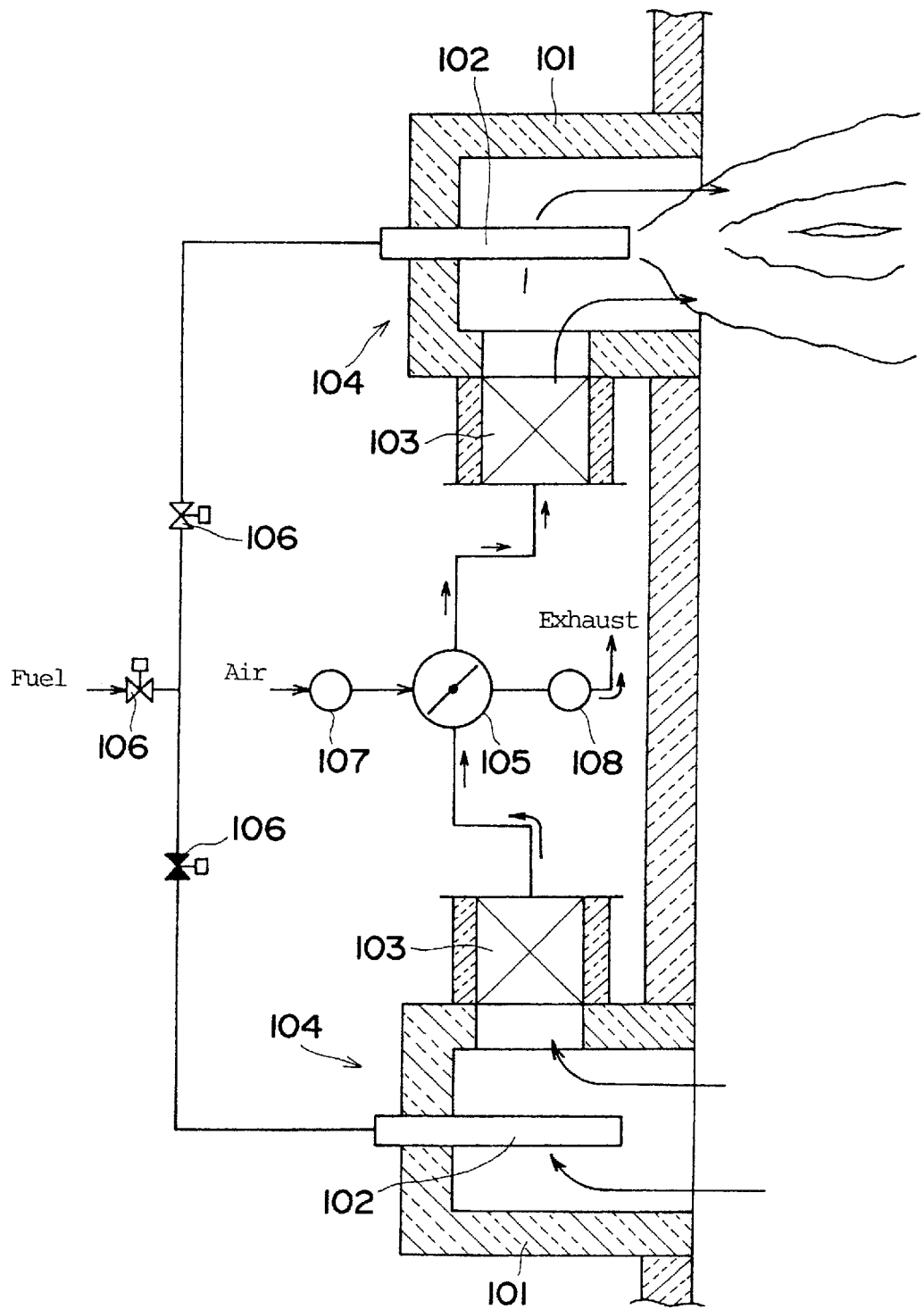
FIG. 18 is a principle view of a prior art regenerative burner.
Figure 19:
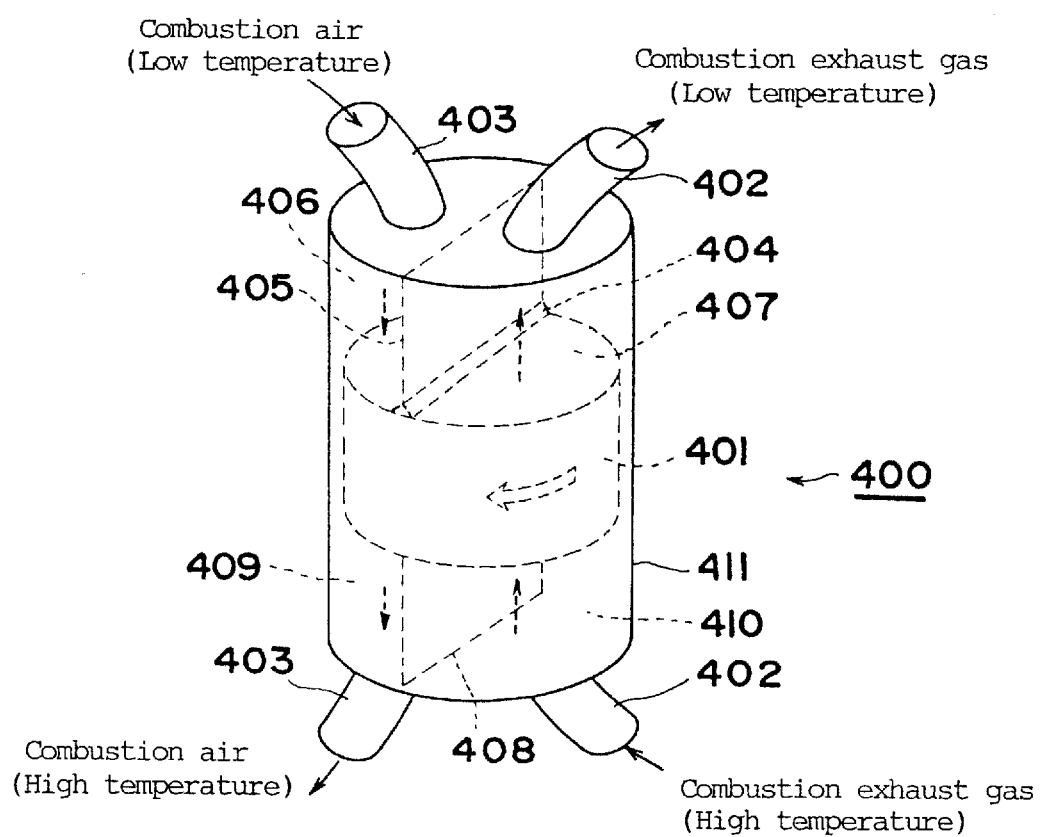
FIG. 19 is a perspective view schematically showing the structure of a Ljungström air preheater.

FIG. 17 shows an example of a regenerative burner and a furnace to which the regenerative heat exchange system 40 of the invention is adopted. The regenerative heat exchanger 40 is connected to a supply system (passage of the low-temperature fluid) 33 through which the combustion air flows and an exhaust system (passage of the high-temperature fluid) 34 through which the exhaust gas flows. A burner 47 carries out combustion with the combustion air supplied through the regenerative heat exchange system 40 while the combustion exhaust gas is taken out of a furnace 35 to be exhausted through the regenerative heat exchange system 40, and the combustion air is preheated to a high temperature close to that of the combustion exhaust gas by the waste heat of the combustion exhaust gas and supplied. The furnace is constituted by installing at least one burner 47 to a furnace body 36. Although the burner 47 does not have specific limitation on its structure and combustion system, it is intended to supply the combustion air through the regenerative heat exchange system 40. Further, the combustion exhaust gas in the furnace 35 is taken out by means of a high-temperature fluid means installed to the furnace body 36, e.g., an exhaust cylinder 46 or the like connected to the exhaust system 34. Note that a reference numeral 44 in the drawing denotes a fan for supplying the combustion air and a numeral 45 designates a fan for exhausting the combustion exhaust gas. In addition, although not shown, auxiliary equipments such as an ignition means, pilot burner and others are usually provided to the burner 47.

Description will now be given as to operations the regenerative heat exchange system 40 having the above-mentioned structure and the regenerative burner adopting this system with reference to FIGS. 15 and 3.

In the first place, when the combustion air as the low-temperature fluid is led into a low-temperature fluid chamber 6a of an outlet/inlet means 6 in the state of FIG. 3, the combustion air flows into a second chamber 9b of a dividing chamber 2 through a low-temperature communicating hole 5 and further moves into a corresponding chamber (chamber through which the low-temperature fluid flows)/ compartment 12 of the regenerator 1. At this stage, since the corresponding compartment/chamber of the regenerator 1 has been heated by heat of the combustion exhaust gas which have passed therethrough before change-over, the combustion air passing therethrough takes heat from the regenerator 1 and raises its temperature to be close to that of the combustion exhaust gas which has heated the regenerator 1. The combustion air then flows into a second chamber 9b of the dividing chamber 2 on the downstream side and is exhausted into a supply chamber 6a through a low-temperature communicating hole 5 of a changeover means 3. Thereafter, the combustion air is supplied to any portion requiring the air, e.g., the burner 47 through the passage 33 connected to the supply chamber 6a. On the other hand, the combustion exhaust gas in the furnace 35 is attracted from the exhaust cylinder 46 to be led into a high-temperature fluid chamber 6b of the outlet/inlet means 6 on the downstream side through the exhaust system 34. The combustion exhaust gas as high-temperature fluid flows into a first chamber 9a of the division chamber 2 through a high-temperature fluid communicating hole 4 and moves into a corresponding chamber (chamber through which the high-temperature fluid flows)/compartment 11 of the regenerator 1. The combustion exhaust gas then heats the compartment 11 of the regenerator 1. The combustion exhaust gas, whose temperature has been lowered, flows into a first chamber 9a of the dividing chamber 2 on the left-hand side and is thereafter exhausted into the high-temperature fluid chamber 6b through the high-temperature fluid communicating hole 4.

Subsequently, when the changeover means 3, which is currently in the state shown in FIG. 1, is continuously or intermittently rotated counterclockwise, the high-temperature fluid communicating hole 4 first reaches a third chamber 9c of the dividing chamber that is provided on the left of the first chamber 9a, and the combustion exhaust gas thereby flows into the first chamber 9a and the third chamber 9c at the same time. Tie combustion exhaust gas passes through a first compartment and a third compartment (portion designated by a reference numeral 10 in FIG. 3) of the regenerator 1 and flows into the first chamber 9a and the third chamber 9c of the division chamber 2 on the downstream side to be supplied into the high-temperature fluid chamber 6b connected to the both chambers 9a and 9c through the high-temperature fluid communicating hole 4. After the position of the high-temperature fluid communicating hole 4 is completely moved to the third chamber 9c (portion which has been a vacant chamber represented by the reference numeral 10 in FIG. 3), the low-temperature fluid communicating hole 5 which has been placed in the second chamber 9b changes its position to the first chamber 9a (chamber denoted by a reference numeral 11 in FIG. 3), and an area partitioned by the second chamber 9b (chamber designated by a reference numeral 12 in FIG. 3) becomes a vacant chamber 10. In other words, the combustion exhaust gas flows into the vacant chamber 10 through which no fluid has flown while the combustion air flows into the chamber 11 through which the combustion exhaust gas has flown, and no fluid flows into the chamber 12 through which the combustion air has flown. Thus, the regenerator 1 is heated by heat of the combustion exhaust gas, and the combustion air passing through the heated regenerator 1 is heated by heat of the regenerator 1. At this stage, the regions/chambers within the regenerator 1 through which the combustion air and the combustion exhaust gas flow are successively changed over, but the flowing systems of the fluid themselves are not changed over in front of or at the rear of the regenerative heat exchange system 40 because these chambers are constantly connected with the high-temperature fluid chamber 6b and the low-temperature fluid chamber 6a of each outlet/inlet means 6. Further, since flows of the fluid are changed while each hole communicates with each chamber even when each hole extends over two chambers using the vacant chamber 10, flows of the fluid are not interrupted. The flow of combustion exhaust gas and that of the combustion air are therefore sequentially changed over one after another without interrupting the flows. Thus, profitability of regenerator can be extremely improved when the burner 47 performs combustion and the combustion exhaust gas generated by the combustion is exhausted through the exhaust system 34 to recover the waste heat of the combustion gas in the regenerative heat exchange system 40. In addition, to the burner 47 is supplied the combustion air preheated by using the waste heat recovered in the regenerative heat exchange system 40. Here, it is preferable that the changeover cycle of the regenerator 1 is relatively short for improving the heat efficiency. For example, the changeover means 3 may be rotated by a length of one chamber/compartment every time 10 to 90 seconds, or more preferably, about 10 seconds lapse, or it may be rotated by a length of one chamber/compartment during 10 seconds. Such a changeover operation within a short time can be assuredly realized by rotation of the respective changeover means 3 provided in front of and at the rear of the regenerator 1 without causing leakage of the exhaust gas. Furthermore, in the case where the size of the high-temperature fluid communicating hole 4 is the same with that of the low-temperature fluid communicating hole 5, the combustion gas expanded by combustion may be preferably exhausted outside of the furnace without passing through the regenerator 1 and supplied to any other heat treatment facility, convection heat exchanger, economizer or heating facility to be used as a heat source. According to the regenerative burner system, the combustion air having a high temperature close to that of the combustion exhaust gas can be stably supplied to the burner without causing momentary reduction or interruption thereof, and regenerative combustion can be effected without changing over supplies of the fuel or the combustion air.

Incidentally, although the present invention is not restricted to the above description which is preferred embodiments thereof, various modifications thereof are possible within the true scope of the invention. For example, the gas having a relatively-high temperature and the gas having a low temperature are exemplified as two types of fluid having temperatures different from each other in the foregoing embodiments, but the present invention is not limited to this application, and it can be applied to heat exchange between a fluid having thermal energy (cold fluid) and a fluid having a higher temperature such as air having a room temperature or heat exchange between different materials. In heat exchange between the thermal fluid and the high-temperature fluid (air having a room temperature), e,g, a refrigerating cycle, the positional relation among respective members are determined in such a manner that the leading communicating hole following the vacant chamber and the chamber/compartment, i.e., the high-temperature fluid communicating hole 4 and the chamber 11 for passing the high-temperature fluid therethrough in the embodiment shown in FIGS. 15 and 16 are used for flowing the thermal fluid therethrough, while the subsequent low-temperature fluid communicating hole 5 and the chamber 12 for passing the low-temperature fluid therethrough are used for flowing the room-temperature fluid which is another target of heat exchange therethrough. In other words, the high-temperature fluid means the fluid for recovering heat (including heat and cold) while the low-temperature fluid means the fluid to be heated (or cooled) by the recovered heat in this specification. Further, the high-temperature fluid communicating hole 4 or the chamber 11 does not necessarily precede the low-temperature fluid communicating hole 5 or the chamber 12, and the hole 5 or the chamber 12 may precede the hole 4 or the chamber 11.

Moreover, each outlet/inlet means 6 is formed by a cylindrical member in the foregoing embodiments, the invention is not restricted to this structure, and the means 6 may be formed by a double-cylindrical member having a hexagon, square or triangular shape. In addition, a number of burner systems is minimum in the foregoing embodiments, but two or more burner systems may be provided in the furnace body.

What is claimed is:

1. A regenerative burner comprising: a regenerator having a center, a circumferential direction and an axial direction; means for partitioning said regenerator into three or more chambers in the circumferential direction, said regenerator passing fluid through each of the chambers in the axial direction; a fuel nozzle piercing through the center of the regenerator for injecting fuel through said regenerator; double-pipe outlet/inlet means having an annular partition wall for defining a supply chamber connected to a combustion air supply system and an exhaust chamber connected to a combustion gas exhaust system; and changeover means between the regenerator and the outlet/inlet means for isolating the regenerator from the outlet/inlet means, the changeover means having a supply communicating hole through which the regenerator communicates with the supply chamber and an exhaust communicating hole through which the regenerator communicates with the exhaust chamber, the relative position of said holes in said changeover means being provided so that said holes do not simultaneously communicate with the same chamber of the regenerator, the changeover means causing at least one chamber of the regenerator to have no fluid flow while other chambers of the regenerator communicate with the exhaust communicating hole and the supply communicating hole respectively, the changeover means being continuously or intermittently rotated to enable successive communication of the exhaust chamber and the supply chamber of the outlet/inlet means with any of the chambers of the regenerator, thereby injecting high-temperature combustion air from the regenerator around a continuously injected fuel jet.

2. A regenerative burner as set forth in claim 1, wherein the regenerator is substantially-equally partitioned into N, N=n+1, where n is a positive even number equal to or above 2 and represents a number of chambers through which the fluid constantly flows in the circumferential direction thereof, wherein n/2 supply communicating holes and n/2 exhaust communicating holes of the changeover means are alternately arranged, wherein each exhaust communicating hole and each supply communicating hole are positioned with an angle $\alpha$ represented by the following formula 1 therebetween:

$$\frac{1}{n-1} \left\{ 360° - \left( \frac{360°}{n+1} + \frac{\beta_1 + \beta_2}{2} \right) \right\} > \quad (1)$$

$$\alpha > \frac{360°}{n+1} + \frac{\beta_1 + \beta_2}{2}$$

where $\beta_1$ represents a central angle circumscribed by a high-temperature fluid communicating hole from a rotational center 0 of the changeover portion while $\beta_2$ represents a central angle circumscribed by a low-temperature fluid communicating hole from a rotational center 0 of the changeover portion, and wherein dimensions of the supply communicating hole and the exhaust communicating hole satisfy the relation represented by the following formula 2:

$$\frac{360°}{n+1} > \frac{n}{2}(\beta_1 + \beta_2) \qquad (2)$$

3. A regenerative burner as set forth in claim 1, wherein the regenerator is substantially-equally divided in the circumferential direction thereof into a plurality of units each of which consists of N, N=n+1, where n is a positive even number equal to or above 2 and represents a number of chambers through which the fluid constantly flows, so that a total number of chambers is Z, where Z=a·N, and a is a positive integer representing a number of units except 0, wherein a vacant chambers, through which no fluid flow, among a total of the Z chambers are provided between N chambers constituting one unit and N chambers forming another unit, wherein an angle α provided between the exhaust communicating hole and the supply communicating hole has a relation represented by the following formula 3:

$$\frac{1}{n-1}\left\{\frac{360°}{a} - \left(\frac{1}{a} \cdot \frac{360°}{n+1} + \frac{\beta_1 + \beta_2}{2}\right)\right\} > \qquad (3)$$

$$\alpha > \frac{1}{a} \cdot \frac{360°}{n+1} + \frac{\beta_1 + \beta_2}{2}$$

and wherein dimensions of the exhaust communicating hole and the supply communicating hole satisfy the relation represented by the following formula 4:

$$\frac{1}{a} \cdot \frac{360°}{n+1} > \frac{n}{2}(\beta_1 + \beta_2) \qquad (4)$$

4. A regenerative burner as set forth in claim 1, wherein the regenerator is substantially-equally divided in the circumferential direction thereof into N chambers, where N=n+2, where n is a positive integer equal to or above 2 and represents a number of chambers through which the fluid constantly flows, and wherein the supply communicating hole and the exhaust communicating hole of the changeover means are placed with an angle C represented by the following formula 5 therebetween:

$$\frac{360°}{N} < C < 2 \cdot \frac{360°}{N} \qquad (5)$$

5. A regenerative burner as set forth in claim 1, wherein the regenerator is substantially-equally divided in the circumferential direction thereof into a plurality of units each of which consists of N chambers, where N=n+2, where n is a positive integer equal to or above 2 and represents a number of chambers through which the fluid constantly flows, so that a total number of chambers is Z, where Z=a·N, and a is a positive integer representing a number of units except 0, and wherein an angle C represented by the following formula 6 is set between the exhaust communicating hole and the supply communicating hole:

$$\frac{360°}{Z} < C < 2 \cdot \frac{360°}{Z} \qquad (6)$$

6. A regenerative burner as set forth in claim 1, wherein the fuel nozzle simultaneously rotates with the changeover means so that the fuel is injected from side toward the combustion air jet injected from the regenerator.

7. A regenerative burner as set forth in claim 1, wherein the fuel from the fuel nozzle and the combustion air from the regenerator are injected in substantially parallel with each other.

8. A regenerative burner as set forth in claim 1, wherein to an outlet of the regenerator on the furnace side are provided independent nozzles communicating with each partitioned chamber of the regenerator.

9. A regenerative burner as set forth in claim 1, wherein a burner throat whose passage cross section narrows toward a tip thereof is formed in front of the regenerator and the fuel nozzle, and there is provided a burner tile having by-pass holes by which the inside of the furnace communicates with the burner throat and which directly lead the exhaust gas in the furnace into the inner portion of the burner throat.

10. A regenerative burner as set forth in claim 1, wherein independent nozzles communicating with each partitioned chamber of the regenerator are provided at an outlet of the regenerator on the furnace side, a single burner throat being formed in front of these nozzle and the fuel nozzle, and a burner tile having therearound a plurality of by-pass holes by which the inside of the furnace communicates with the burner throat and which directly lead the exhaust gas in the furnace into the inner portion of the burner throat being provided.

11. A regenerative burner as set forth in claim 1, wherein a number of chambers which communicate with the exhaust chamber to pass the combustion exhaust gas therethrough is larger than a number of chambers which communicate with the supply chamber to pass the combustion air therethrough.

12. A regenerative burner as set forth in claim 1, wherein the regenerator is divided into a·N, where a is a number of units, chambers by providing between the regenerator and each changeover means dividing means which is divided in the circumferential direction thereof into a·N chambers and capable of passing the fluid therethrough in the axial direction.

13. A regenerative burner as set forth in claim 1, wherein the regenerator has a honeycomb shape having a plurality of cell holes communicating in the axial direction thereof.

14. A regenerative burner as set forth in claim 1, wherein the regenerator is constituted by arranging a plurality of pipe type regenerative members in the radial direction thereof so as to pass the fluid therethrough in the axial direction thereof.

15. A regenerative burner as set forth in claim 1, wherein the regenerator is constituted by radially arranging a plurality of flat-plate type or corrugated-plate type regenerative members.

16. A regenerative burner as set forth in claim 1, wherein the regenerator is constituted by filling blocks or small pieces of regenerative material in a casing which is independently divided into a·N chambers and capable of passing the fluid therethrough in the axial direction thereof.

17. A regenerative heat exchange system comprising: regenerator with open ends and divided into three or more chambers in a circumferential direction in such a manner that fluid can pass through each of the chambers; double-pipe outlet/inlet means connected to both opening ends of the regenerator, each of which means being partitioned by an annular partition wall into a low-temperature fluid chamber connected to a low-temperature fluid system of two types of passage through which two types of fluid having different temperatures flow and a high-temperature fluid chamber connected to a high-temperature fluid system through which two types of fluid having different temperatures flow; and changeover means which is provided between the regenerator and each outlet/inlet means provided in front of or at the rear of the regenerator to isolate the regenerator from the outlet/inlet means, the changeover means being provided with a low-temperature fluid communicating hole by which the regenerator communicates with the low-temperature fluid chamber and a high-temperature fluid communicating hole by which the regenerator communicates with the high-temperature fluid chamber, the holes not simultaneously communicating with the same chamber of the regenerator, the changeover means causing at least one chamber through which no fluid flows among chambers of the regenerator while the high-temperature fluid communicating hole and the low-temperature fluid communicating hole are positioned respectively to communicate with other chambers of the regenerator, the changeover means being continuously or intermittently rotated to enable successive communication of the low-temperature fluid chamber and the high-temperature fluid chamber of each outlet/inlet means provided in front of and at the rear of the regenerator with any of the chambers of the regenerator.

18. A regenerative heat exchange system as set forth in claim 17, wherein the regenerator is substantially-equally divided in the circumferential direction thereof into N chambers, N=n+1, where n is a positive even number equal to or above 2 and represents a number of chambers through which the fluid constantly flows, wherein n/2 low-temperature communicating holes and n/2 high-temperature communicating holes of each of the changeover means provided in front of and at the rear of the regenerator are alternately arranged, wherein each high-temperature communicating hole and each low-temperature communicating hole are placed with an angle $\alpha$ represented by the following formula 1 therebetween:

$$\frac{1}{n-1}\left\{360° - \left(\frac{360°}{n+1} + \frac{\beta_1+\beta_2}{2}\right)\right\} > \qquad (1)$$

$$\alpha > \frac{360°}{n+1} + \frac{\beta_1+\beta_2}{2}$$

where $\beta_1$ represents a central angle circumscribed by a high-temperature fluid communicating hole from a rotational center 0 of the changeover means while $\beta_2$ represents a central angle circumscribed by a low-temperature fluid communicating hole from a rotational center 0 of the changeover means, and wherein dimensions of each low-temperature communicating hole and each high-temperature communicating hole satisfy the following formula 2:

$$\frac{360°}{n+1} > \frac{n}{2}(\beta_1+\beta_2) \qquad (2)$$

19. A regenerative heat exchange system as set forth in claim 17, wherein the regenerator is substantially-equally divided in the circumferential direction thereof into a plurality of units each of which consists of N chambers, where N=n+1, and n is a positive even number equal to or above 2 and represents a number of chambers through which the fluid constantly flows, so that a total number of chambers is Z, where Z=a·N, and a is a positive integer representing a number of units except 0, wherein a vacant chambers, through which no fluid always flow, among a total of the Z chambers are provided between N chambers constituting one unit and N chambers forming another unit, wherein an angle $\alpha$ provided between the high-temperature communicating hole and the low-temperature communicating hole has a relation represented by the following formula 3:

$$\frac{1}{n-1}\left\{\frac{360°}{a} - \left(\frac{1}{a}\cdot\frac{360°}{n+1} + \frac{\beta_1+\beta_2}{2}\right)\right\} > \qquad (3)$$

$$\alpha > \frac{1}{a}\cdot\frac{360°}{n+1} + \frac{\beta_1+\beta_2}{2}$$

and wherein dimensions of the high-temperature communicating hole and the low-temperature communicating hole satisfy the relation represented by the following formula 4:

$$\frac{1}{a}\cdot\frac{360°}{n+1} > \frac{n}{2}(\beta_1+\beta_2) \qquad (4)$$

20. A regenerative heat exchange system as set forth in claim 17, wherein the regenerator is substantially-equally divided in the circumferential direction thereof into N, N=n+2 where n is a positive integer equal to or above 2 and represents a number of chambers through which the fluid constantly flows and wherein the low-temperature communicating hole and the high-temperature communicating hole are arranged with an angle C represented by the following formula 5 therebetween:

$$\frac{360°}{N} < C < 2\cdot\frac{360°}{N} \qquad (5)$$

21. A regenerative heat exchange system as set forth in claim 17, wherein the regenerator is substantially-equally divided in the circumferential direction thereof into a plurality of units each of which consists of N, where N=n+2, and n is a positive integer equal to or above 2 and represents a number of chambers through which the fluid constantly flows so that a total number of chambers is Z where Z=a·N, and a is a positive integer representing a number of units except 0 and wherein an angle C represented by the following formula 6 is set between the high-temperature communicating hole and the low-temperature communicating hole:

$$\frac{360°}{Z} < C < 2\cdot\frac{360°}{Z} \qquad (6)$$

22. A regenerative heat exchange system as set forth in claim 17, wherein the regenerator is partitioned into a·N chamber, where a represents a number of units chambers by providing between the regenerator and each changeover means positioned in front of or at the rear of the regenerator dividing means which is divided in the circumferential direction thereof into a·N chambers and capable of passing the fluid therethrough in the axial direction thereof.

23. A regenerative heat exchange system as set forth in claim 17 wherein the regenerator has a honeycomb shape having a plurality of cell holes communicating in the axial direction thereof.

24. A regenerative heat exchange system as set forth in claim 17, wherein the regenerator is constituted by arranging a plurality of pipe type regenerative members in the radial direction thereof in such a manner that the fluid can flow in the axial direction thereof.

25. A regenerative heat exchange system as set forth in claim 17, wherein the regenerator is constituted by radially arranging a plurality of flat-plate type or corrugated-plate type regenerative members.

26. A regenerative heat exchange system as set forth in claim 17, wherein the regenerator is constituted by filling blocks or small pieces of regenerative material in a casing which is independently partitioned into a·N chambers and capable of passing the fluid therethrough in the axial direction thereof.

27. A regenerative burner characterized in that the regenerative heat exchanger defined in claim 17 is connected to a combustion air system and a combustion exhaust gas system of a burner system, the burner performing combustion by combustion air supplied through the regenerative heat exchange system, combustion exhaust gas being exhausted through the regenerative heat exchange system, and the combustion air being preheated to a high temperature close to a temperature of the combustion exhaust gas using the waste heat of the combustion exhaust gas, thereby supplying the thus-preheated combustion air.

* * * * *